US012568120B2

(12) United States Patent
Ichikawa et al.

(10) Patent No.: US 12,568,120 B2
(45) Date of Patent: Mar. 3, 2026

(54) IMAGE FORMING DEVICE RESTRICTING TRANSMISSION OF EMAIL HAVING SCAN DATA TO EMAIL ADDRESS WHEN MEMORY STORES NO DOMAIN MATCHING DOMAIN OF THE MAIL ADDRESS

(71) Applicant: BROTHER KOGYO KABUSHIKI KAISHA, Nagoya (JP)

(72) Inventors: Kazuki Ichikawa, Gamagori (JP); Katsunori Enomoto, Toyokawa (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 53 days.

(21) Appl. No.: 18/392,549

(22) Filed: Dec. 21, 2023

(65) Prior Publication Data

US 2024/0259432 A1 Aug. 1, 2024

(30) Foreign Application Priority Data

Jan. 30, 2023 (JP) ................................. 2023-011793

(51) Int. Cl.
H04L 9/40 (2022.01)
(52) U.S. Cl.
CPC .......... H04L 63/20 (2013.01); H04L 63/0876 (2013.01)
(58) Field of Classification Search
CPC ............................ H04L 63/0876; H04L 63/20
See application file for complete search history.

(56) References Cited

U.S. PATENT DOCUMENTS

| | | | |
|---|---|---|---|
| 12,335,448 B2 * | 6/2025 | Shibao | H04N 1/32096 |
| 2007/0229913 A1 | 10/2007 | Aiso et al. | |
| 2023/0291739 A1 * | 9/2023 | Nielson | H04N 1/00225 |
| 2025/0112934 A1 * | 4/2025 | Greevy | H04L 63/105 |

FOREIGN PATENT DOCUMENTS

JP          2007-214962 A          8/2007

* cited by examiner

*Primary Examiner* — Gil H. Lee
(74) *Attorney, Agent, or Firm* — Scully, Scott, Murphy & Presser, PC

(57) ABSTRACT

In an image forming device, on a condition that a transmission instruction including an email address is received, and the memory stores a registered domain matching a target domain extracted from the email address, a controller performs a transmission process. The transmission instruction is an instruction to transmit scan data to be generated by the scanner to the email address. The transmission process is to transmit an email having the generated scan data to the email address. On a condition that the transmission instruction is received, and the memory stores no registered domain matching the target domain, the controller restricts the transmission process. On a condition that the transmission instruction is received, the memory stores no registered domain matching the target domain, and the target domain is a subdomain of a specific domain, the controller performs the transmission process. The specific domain is a registered domain stored in the memory.

17 Claims, 15 Drawing Sheets

| | |
|---|---|
| iFax SETTING | ON |
| SCAN-TO-EMAIL SETTING | ON |
| PERMITTED DOMAIN (1) | brother.co.jp |
| PERMITTED DOMAIN (2) | brothergroup.net |
| PERMITTED DOMAIN (3) | brother.ne.jp |
| PERMITTED DOMAIN (4) | |
| PERMITTED DOMAIN (5) | |
| SUBDOMAIN PERMISSION SETTING (1) | OFF |
| SUBDOMAIN PERMISSION SETTING (2) | ON |
| SUBDOMAIN PERMISSION SETTING (3) | ON |
| SUBDOMAIN PERMISSION SETTING (4) | OFF |
| SUBDOMAIN PERMISSION SETTING (5) | OFF |
| PERMITTED DISTINCT DOMAINS (1) | |
| PERMITTED DISTINCT DOMAINS (2) | ap;dp; |
| PERMITTED DISTINCT DOMAINS (3) | |
| PERMITTED DISTINCT DOMAINS (4) | |
| PERMITTED DISTINCT DOMAINS (5) | |
| EMAIL SUBJECT | Internet Fax Job |
| EMAIL BODY | Image data has been attached. |
| EMAIL REPORT ADDRESS | admin@brother.com |
| EMAIL REPORT TRANSMISSION INTERVAL | Sunday |

| | |
|---|---|
| SHORTCUT FUNCTION (1) | ScanToEmail |
| EMAIL ADDRESS | user1@brother.co.jp |
| SCREEN READING SETTINGS | OFF |
| COLOR SETTINGS | Color |
| RESOLUTION | 200dpi |
| FILE TYPE | PDF |
| ... | ... |
| SHORTCUT FUNCTION (2) | IFAX |
| EMAIL ADDRESS | user2@brother.co.jp |
| SCREEN READING SETTINGS | OFF |
| RESOLUTION | Standard |
| CONTRAST | Auto |
| ... | ... |
| SHORTCUT FUNCTION (3) | Copy |
| ... | ... |
| SHORTCUT FUNCTION (n) | |
| ... | |

IMAGE FORMING DEVICE RESTRICTING TRANSMISSION OF EMAIL HAVING SCAN DATA TO EMAIL ADDRESS WHEN MEMORY STORES NO DOMAIN MATCHING DOMAIN OF THE MAIL ADDRESS

REFERENCE TO RELATED APPLICATIONS

This application claims priority from Japanese Patent Application No. 2023-011793 filed on Jan. 30, 2023. The entire content of the priority application is incorporated herein by reference.

BACKGROUND ART

A conventional image-forming device has a function for transmitting scan data generated by a scanner via email.

SUMMARY

It is an object of the present disclosure to provide an image-forming device that transmits scan data by email to a suitable destination.

In order to attain the above and other object, the present disclosure provides an image forming device. The image forming device includes a communication interface, a memory, a controller, and a scanner. The controller is configured to perform: a transmission process on a first condition that a transmission instruction including an email address is received, and the memory stores, which can store one or more registered domains, a registered domain matching a target domain extracted from the email address, the transmission instruction being an instruction to transmit scan data to be generated by the scanner to the email address, the transmission process being to transmit an email having the generated scan data to the email address; restricting the transmission process on a second condition including a condition that the transmission instruction is received, and the memory stores no registered domain matching the target domain; and the transmission process on a third condition including a condition that the transmission instruction is received, the memory stores no registered domain matching the target domain, and the target domain is a subdomain of a specific domain, the specific domain being a registered domain stored in the memory.

According to another aspect, the disclosure provides an image forming device. The image forming device includes a communication interface, a memory, a controller, and a scanner. The controller is configured to perform: a transmission process on a first condition that a transmission instruction including an email address is received, and the memory, which can store one or more registered domains, stores a registered domain matching a target domain extracted from the email address, the transmission instruction being an instruction to transmit scan data to be generated by the scanner to the email address, the transmission process being to transmit an email having the generated scan data to the email address; restricting the transmission process on a second condition including a condition that the transmission instruction is received, and the memory stores no registered domain matching the target domain; and the transmission process on a third condition including a condition that the transmission instruction is received, the memory stores no registered domain matching the target domain, and the target domain is a specific subdomain of a registered domain stored in the memory, the specific subdomain being specified by information related to the subdomain stored in the memory.

According to another aspect, the disclosure provides an image forming device. The image forming device includes a communication interface, a memory, a controller, and a scanner. The controller is configured to perform: acquiring an email address for transmitting scan data from the memory or an external device; a transmission process on a first condition that the email address for transmitting scan data to be generated by the scanner is acquired, and the memory, which can store one or more registered domains, stores a registered domain matching a target domain extracted from the email address, the transmission process being to transmit an email having the generated scan data generated by the scanner to the email address; restricting the transmission process on a second condition including a condition that the email address for transmitting scan data to be generated by the scanner is acquired, and the memory stores no registered domain matching the target domain, the restricting the transmission process being performed irrespective of whether the email address is acquired from the memory or the external device.

According to another aspect, the disclosure provides an image forming device. The image forming device includes a communication interface, a memory, a controller, and a scanner. The memory stores shortcut information including: a setting value to be used to generate scan data; and an email address to which the scan data is to be transmitted via the communication interface. The controller is configured to perform: a transmission process on a first condition including a condition that a shortcut instruction including the email address in the shortcut information is received, and the memory, which can store one or more registered domains, stores a registered domain as information different from the shortcut information matching a target domain extracted from the email address in the shortcut information, the shortcut instruction being to transmit scan data to be generated by the scanner to the email address included in the shortcut information, the transmission process being to transmit the generated scan data to the email address included in the shortcut information with the setting value included in the shortcut information; and restricting the transmission process on a second condition including a condition that the shortcut instruction is received, and the memory stores no registered domain matching a target domain extracted from the email address in the shortcut information.

In the above structure, a transmission of scan data can be properly restricted when the memory stores no registered domain matching the target domain.

BRIEF DESCRIPTION OF DRAWINGS

FIG. 4 is a table illustrating a permission list.

FIG. 15 is a table illustrating shortcut information.

DESCRIPTION

Figure 1:
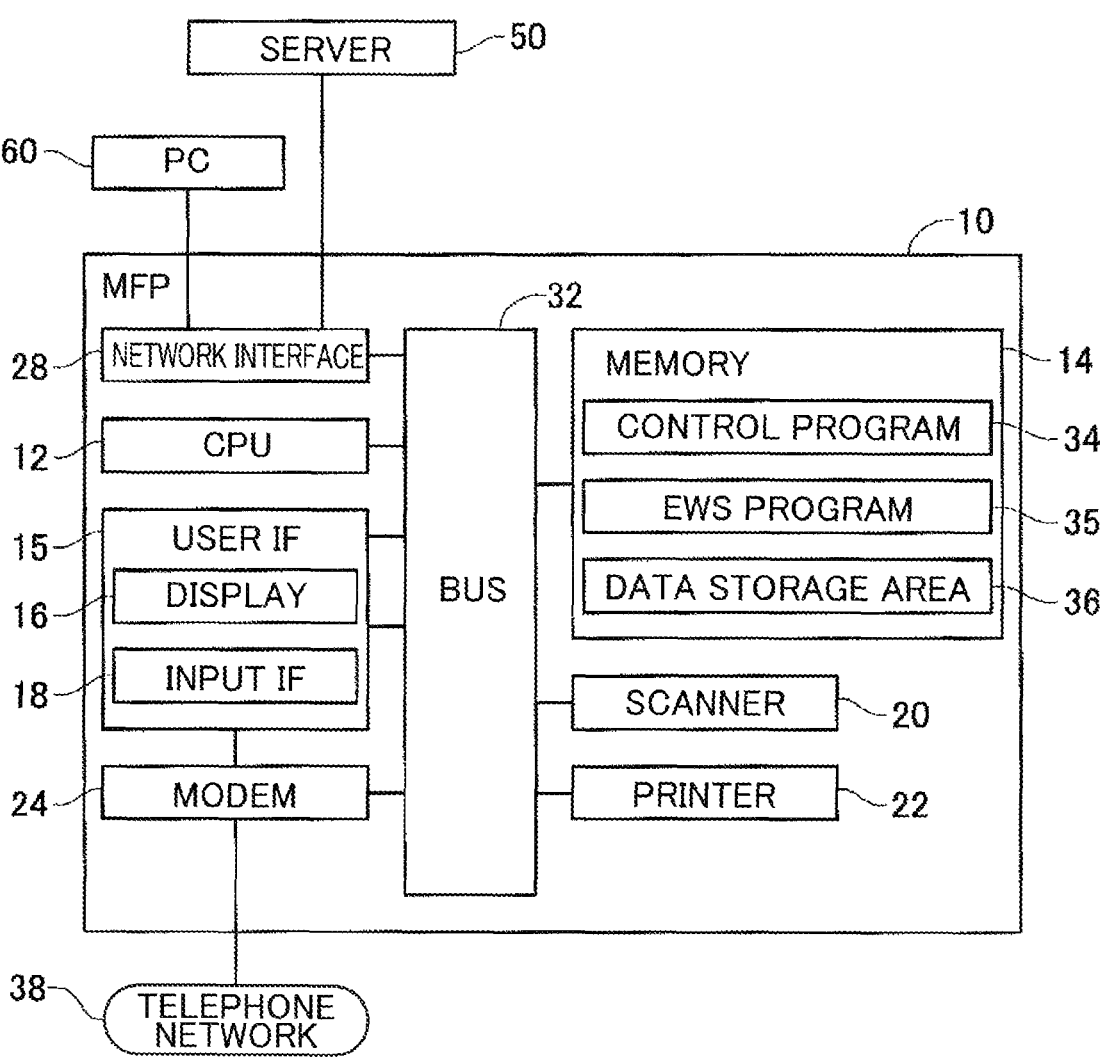
FIG. 1 is a block diagram illustrating a communication system.

Below, an embodiment of the present disclosure will be described while referring to the drawings as needed. FIG. 1 is a block diagram of a communication system according to the present embodiment. The communication system shown in FIG. 1 is provided with a multifunction peripheral (MFP) 10, a server 50, and a personal computer (PC) 60. The MFP 10 is an example of an image forming device. The server 50 is an example of an external device.

The MFP 10 is primarily provided with a CPU 12 (an example of a controller), a memory 14, a user interface 15, a scanner 20, a printer 22, a modem 24, and a network interface 28. "Interface" is abbreviated as "IF" in the drawings. These components can communicate with each other via a bus 32.

The CPU 12 performs processes according to a control program 34 stored in the memory 14. The CPU 12 also functions as a web server by executing processes according to an embedded web server (EWS) program 35. The EWS program 35 is also stored in the memory 14. The web server implemented by the CPU 12 operating in accordance with the EWS program 35 will also be called an EWS. The memory 14 is also provided with a data storage area 36. The data storage area 36 stores data and the like required for executing the control program 34, the EWS program 35, and the like. The memory 14 is configured of a combination of RAM, flash memory, a buffer provided in the CPU 12, and the like. The memory 14 may 14 may further be combined with a hard disk drive (HDD), a portable storage medium such as USB memory detachably mounted in the MFP 10, and the like. The memory 14 may also be a single type of memory, such as RAM.

The memory 14 may be any storage medium that can be read by a computer. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The user interface 15 has a display 16, and an input interface 18. The display 16 is a liquid crystal display that displays various information about the MFP 10. The display is not limited to a liquid crystal display, but may be another type of display, such as an OLED display. The input interface 18 is a touchscreen configured integrally with the display 16, for example. The input interface 18 accepts user operations on icons, buttons, and the like displayed on the display 16. The input interface 18 may also include hard keys or the like in addition to the touchscreen. The display in the input interface 18 or the input interface 18 is an example of a user interface.

The scanner 20 has an image sensor, such as a charge-coupled device (CCD) or a compact image sensor (CIS), that generates image data while reading an original. The printer 22 performs printing operations to print images on recording media, such as sheets or disks. Sheets may also be referred to as paper. The printer 22 may employ various recording methods, such as an inkjet method or an electrophotographic method.

The modem 24 modulates the document data to be transmitted by the facsimile function into a transmittable signal and transmits the signal via a telephone network 38. The modem 24 also receives signals inputted via the telephone network 38 and demodulates the signals into document data.

The network interface 28 is an interface that performs communications in conformance with TCP/IP or another network protocol. The network interface 28 enables the MFP 10 to communicate with external devices, including the server 50 and PC 60.

In the following description, actions such as "determine," "extract," "select," "calculate," "decide," "identify," "acquire," "receive," "control," "set," and the like represent processes performed by the CPU 12. Processes performed by the CPU 12 include processes that control hardware through an application programming interface (API) provided in an operating system (OS).

In the following description, the phrase "the program B controls the hardware C" may signify "the program B controls the hardware C using the API of the OS". The phrase "the CPU 12 performs the process according to the program" may be described in abbreviated expressions, such as, "the CPU 12 performs the process". Further, the phrase "the CPU 12 performs the process according to instructions described in the program A" may be abbreviates as "the program A performs the process".

Note that the term "acquire" in this specification is used as a concept that does not necessarily require a request. In other words, a process by which the CPU 12 receives data without requesting that data is included in the concept of "the CPU 12 acquires data." The term "data" described herein is expressed as bit strings that can be read by a computer. Data of different formats are treated as the same data when the content of the data is essentially the same. The same holds true for "information" in this specification. An "instruction," a "response," a "request," or the like is processed by communicating information indicating the "instruction," the "response," or the "request." The terms "instruction," "response," and "request" may also be used to describe information indicating an "instruction," a "response," or a "request."

Further, a process performed by the CPU 12 to determine whether information A indicates circumstance B may be described conceptually as "determining whether circumstance B based on information A." A process in which the CPU 12 determines whether information A indicates circumstance B or circumstance C may be described conceptually as "determining whether circumstance B or circumstance C based on information A."

The MFP 10 can perform Internet fax (iFax) and scan-to-email processes. The iFax and scan-to-email processes create scan data by reading an image with the scanner 20 and transmit this scan data to a desired email address. The iFax process is a process for creating scan data created in accordance with an international standard and transmitting the created scan data in accordance with the international standard. The scan-to-email process is a process for creating scan data created in accordance with a specific standard and transmitting the created scan data in accordance with the specific standard. Here, the specific standard is different from the international standard of the iFax process and may be a standard specific to a vendor of the MFP 10. A permission list is stored in the memory 14 of the MFP 10. In the iFax process and scan-to-email process, the MFP 10 restricts the transmission of scan data to email addresses not registered in the permission list. The iFax process and the scan-to-email process are examples of a second process.

First, the setting of various parameters related to sending email, such as a permission list, will be described. Here, the storing of parameters in the memory 14 may be referred to as "setting" or "registering." The user of the MFP 10 registers a permission list 90 (FIG. 4) on the MFP 10 through a web page provided by the EWS. Specifically, the PC 60 accesses the MFP 10 using a browser and sends a web page display request to the MFP 10. A process performed by the MFP 10 according to the control program 34 upon receiving this web page display request will be described below while referring to the flowchart in FIG. 2.

Figure 2:
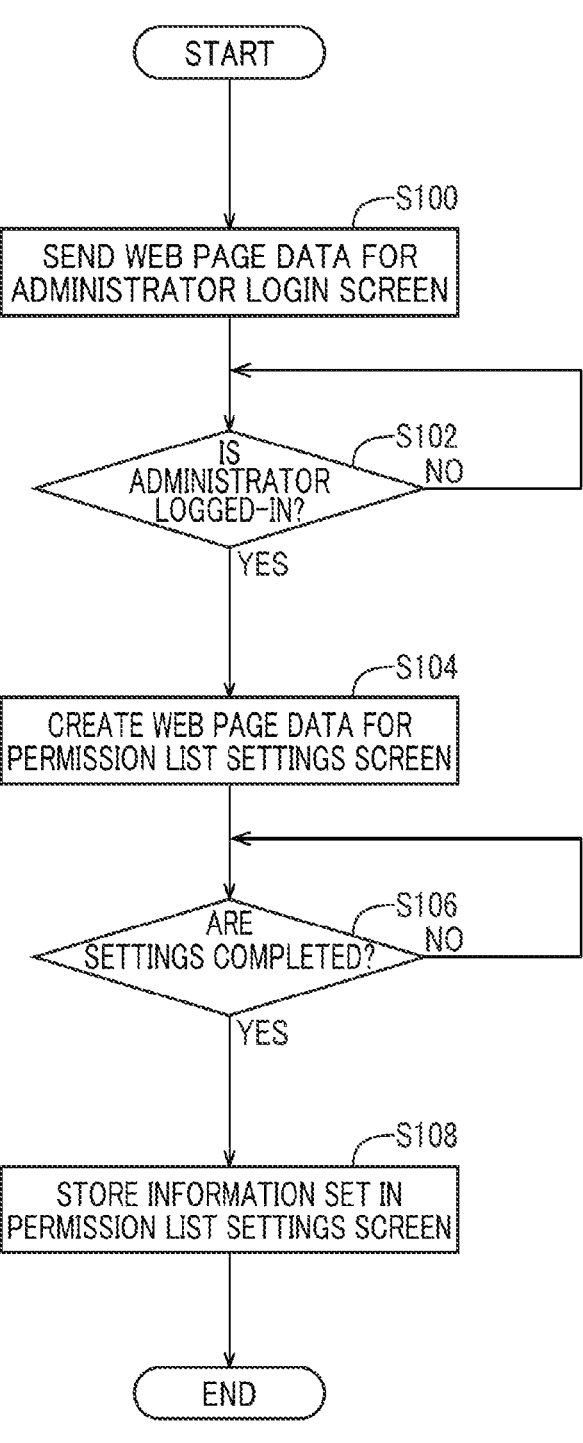
FIG. 2 is a flowchart illustrating a process performed according to a control program.

After the PC 60 has issued a web page display request to the MFP 10, in S100 of FIG. 2 the CPU 12 of the MFP 10 functioning as the EWS sends web page data for an administrator login screen to the PC 60. The browser on the PC 60 receives the web page data and displays the screen represented by the web page data on a display of the PC 60. The user of the PC 60 can then perform operations in the screen displayed by the browser using a user interface of the PC 60. The PC 60 transmits information specifying the content of operations in the browser to the MFP 10. The action of the MFP 10 receiving information about operations performed in a screen displayed on the basis of web page data may simply be referred to as the MFP 10 receiving operations through the screen or operations being inputted in the screen or may be described as the MFP 10 receiving operations through a web page or operations being inputted in the web page.

In S102 the CPU 12 determines whether administrator login operations were been received from the PC 60 through the administrator login screen. Specifically, the CPU 12 determines whether login information (identification information) of the administrator was received and whether the login data is authentic. The CPU 12 repeats this determination while such operations have not been received or while the administrator login is not successful (S102: NO). When the administrator login is successful (S102: YES), the CPU 12 reads parameters from the permission list 90 stored in the data storage area 36. Administrator login operations may be the input of an administrator ID and a password, for example. Parameters may also be called settings. The parameters in the permission list 90 may also simply be called the permission list 90. In S104 the CPU 12 creates web page data for a permission list settings screen 70 (FIG. 3) based on the permission list 90 read above and sends the web page data to the PC 60. The PC 60 then displays the permission list settings screen.

Figure 3:
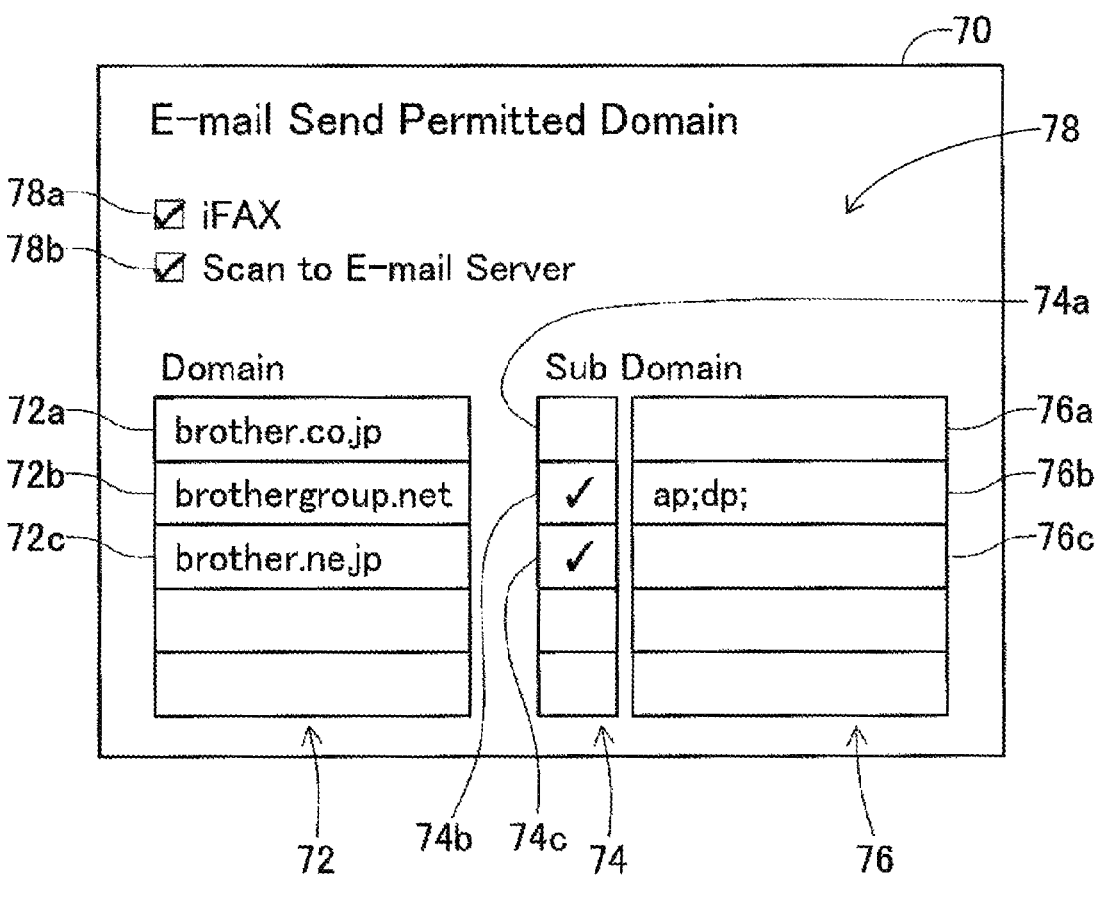
FIG. 3 is an explanatory diagram illustrating a permission list settings screen.

FIG. 3 shows a permission list settings screen 70 as an example of a specification screen. The permission list settings screen 70 includes a target selection area 78, a permitted domain entry area 72, a subdomain permission setting area 74, and a permitted distinct domain entry area 76. The permitted domain entry area 72 is an area for inputting domains. A domain is the string of characters following the at sign (@) in an email address. In the example of FIG. 3, the permitted domain "brother.co.jp" has been entered into a permitted domain entry field 72a, the permitted domain "brothergroup.net" has been entered into a permitted domain entry field 72b, and the permitted domain "brother.ne.jp" has been entered into a permitted domain entry field 72c. In the present description, a domain name is referred to as "domain" for simplicity. A domain name consists of one or more parts (character strings), referred to as "labels", that are concatenated and delimited by dots. For example, the domain "ap.brothergroup.net" consists of labels "ap", "brothergroup", and "net".

The subdomain permission setting area 74 is an area for setting an option to allow scan data to be sent to subdomain email addresses of the corresponding domain in the iFax process and the scan-to-email process (when those processes have been selected in the target selection area 78). The subdomain permission setting area 74 in the example of FIG. 3 includes three subdomain permission checkboxes 74a, 74b, and 74c respectively corresponding to the permitted domain entry fields 72a, 72b, and 72c. A checkmark is entered into the subdomain permission checkbox 74a, 74b, or 74c to permit the transmission of scan data to subdomain email addresses of the domain in the corresponding permitted domain entry field 72a, 72b, or 72c. The permitted distinct domain entry area 76 is used to enter distinct domains of subdomains that are permitted when the transmission of scan data to subdomain email addresses is not restricted. That is, the distinct domains are labels for specifying the subdomains. In the example of FIG. 3, the permitted distinct domain entry field 76 has three permitted distinct domain entry fields 76a, 76b, and 76c respectively corresponding to the permitted domain entry fields 72a, 72b, and 72c. The target selection area 78 is displayed above the permitted domain entry area 72. In the example of FIG. 3, the target selection area 78 includes checkboxes 78a and 78b for selecting one or more of the iFax process and the scan-to-email process as the target of the permission list 90.

Returning to the process in FIG. 2, in S106 the CPU 12 determines whether settings are completed in the permission list settings screen 70 and continues to repeat the determination while settings are not complete (S106: NO). Once the CPU 12 determines that settings are complete (S106: YES), in S108 the CPU 12 saves the information set in the permission list settings screen 70 in the data storage area 36, as illustrated in FIG. 4. That is, the CPU 12 registers or updates the permission list 90 on the MFP 10. Thus, only the administrator of the MFP 10 can register the permission list 90 on the MFP 10.

In the example shown in FIG. 4, an iFax setting 80a and a scan-to-email setting 80b indicate whether a checkmark was inputted into the corresponding checkboxes 78a and 78b in the target selection area 78. Each of the iFax setting 80a and the scan-to-email setting 80b is set to ON when a checkmark has been inputted into a corresponding one of the checkboxes 78a and 78b, and is set to OFF when a checkmark has not been inputted into the corresponding one of the checkboxes 78a and 78b.

Permitted domains 80c-80g indicate the permitted domains entered into the permitted domain entry area 72. Subdomain permission settings 80h-80l indicate whether checkmarks were entered into corresponding checkboxes in the subdomain permission setting area 74. Each of the subdomain permission settings 80h-80l is set to ON when a checkmark has been entered into a corresponding one of checkboxes of the subdomain permission setting area 74, and is set to OFF when a checkmark has not been entered into the corresponding one of checkboxes of the subdomain permission setting area 74. Permitted distinct domains 80m-80q specify the distinct domains (labels specifying the subdomains) entered in the permitted distinct domain entry area 76.

The user can also configure settings for an email report issuing process (an example of a first process) in a web page provided by the EWS. The email report issuing process is performed to send an email report to the administrator of the MFP 10. This email report includes information on the MFP 10 such as network information, operation history information, counter information, and consumables information. Once an administrator has successfully logged in to the web page, the CPU 12 reads parameters for the email report issuing process from the data storage area 36, creates web page data representing a settings screen for the email report issuing process on the basis of these parameters, and transmits the web page data to the PC 60.

After the PC 60 displays this settings screen, the administrator of the MFP 10 enters a destination email address for the email report in the settings screen. The administrator also inputs a transmission interval in the settings screen indicating the interval (i.e., the frequency) for transmitting email reports. The transmission interval may be set to send an email report every Sunday, for example. The various parameters inputted into the settings screen for the email report issuing process are stored in the memory 14. FIG. 4 shows an example of various parameters for the email report issuing process saved in the data storage area 36, including an email report address 80*t* and an email report transmission interval 80*u*.

The permission list settings screen 70 shown in FIG. 3 does not include an option to select execution of the email report issuing process.

For sending email in the iFax process or the scan-to-email process, the email subject and email body can also be set in a web page. When the email subject and body are set in the web page, an email subject 80*r* and an email body 80*s* are saved in the data storage area 36, as shown in FIG. 4.

Figure 5:
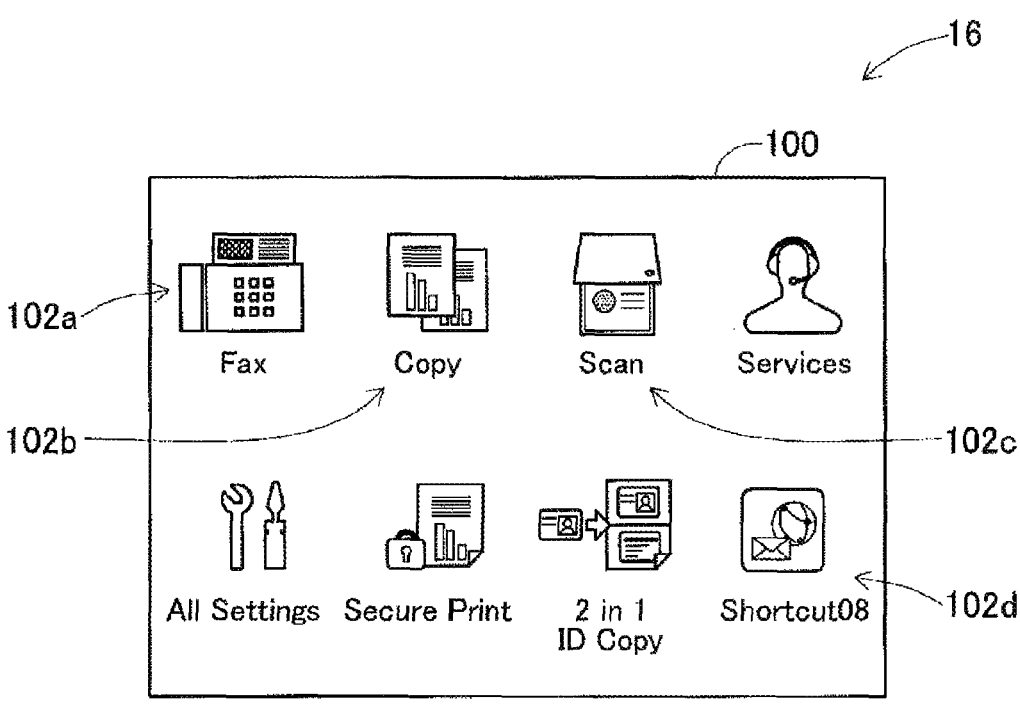
FIG. 5 is an explanatory diagram illustrating a home screen.

Next, a process performed on the MFP 10 for sending email will be described. While in an idle state, the MFP 10 displays a home screen 100 shown in FIG. 5 on the display 16. The home screen 100 includes various icons 102 corresponding to image processes that the MFP 10 can perform. The icons 102 in the example of FIG. 5 are a Fax icon 102*a* for executing a fax process, a Print icon 102*b* for executing a printing process, and a Scan icon 102*c* for executing a scanning process. Here, when the user wishes to perform the "scan-to-email, the user selects the Scan icon 102*c* and sets necessary settings for the "scan-to-email". That is, the user can select the job type in which scan data is to be transmitted through the operations using screens including the home screen 100 shown in FIG. 5. Note that the Shortcut icon 102*d* will be described later. In the example, the job type is one of the scan-to-email and the iFax. Each of the scan-to-mail and the iFax defines a transmission process of an email having scan data. That is, selecting the job type indicates selecting a manner in which the email is to be transmitted.

The user operates the Fax icon 102*a* to perform the iFax process. In response, the CPU 12 displays an input screen on the display 16 for inputting a destination email address for the iFax process. The user can manually input an email address in this input screen. Additionally, a telephone directory is stored in the data storage area 36 of the MFP 10 and registers one or more email addresses. In the input screen, the user can select any of the one or more email addresses from the directory stored in the data storage area 36. The server 50 also stores a telephone directory in which one or more email addresses are registered. The CPU 12 can receive email addresses from the server 50. Accordingly, the user can select any of the one or more email addresses from the telephone directory stored on the server 50 in the input screen. Thus, the user sets the destination email address for the iFax process by manually inputting an email address or by selecting an email address from a telephone directory. A Start button is also displayed in the input screen. When the user operates this Start button, the MFP 10 performs a process according to the control program 34. In other words, when the user selects the Fax icon 102*a,* sets the destination email address, and operates the Start button, the control program 34 receives a transmission instruction to transmit scan data to the destination email address via the iFax process. Here, a non-administrator user as well as the administrator of the MFP 10 can issue the transmission instruction and thus is permitted to set the email address for the transmission instruction. This process will be described next with reference to the flowcharts in FIGS. 6 through 10.

Figure 6:
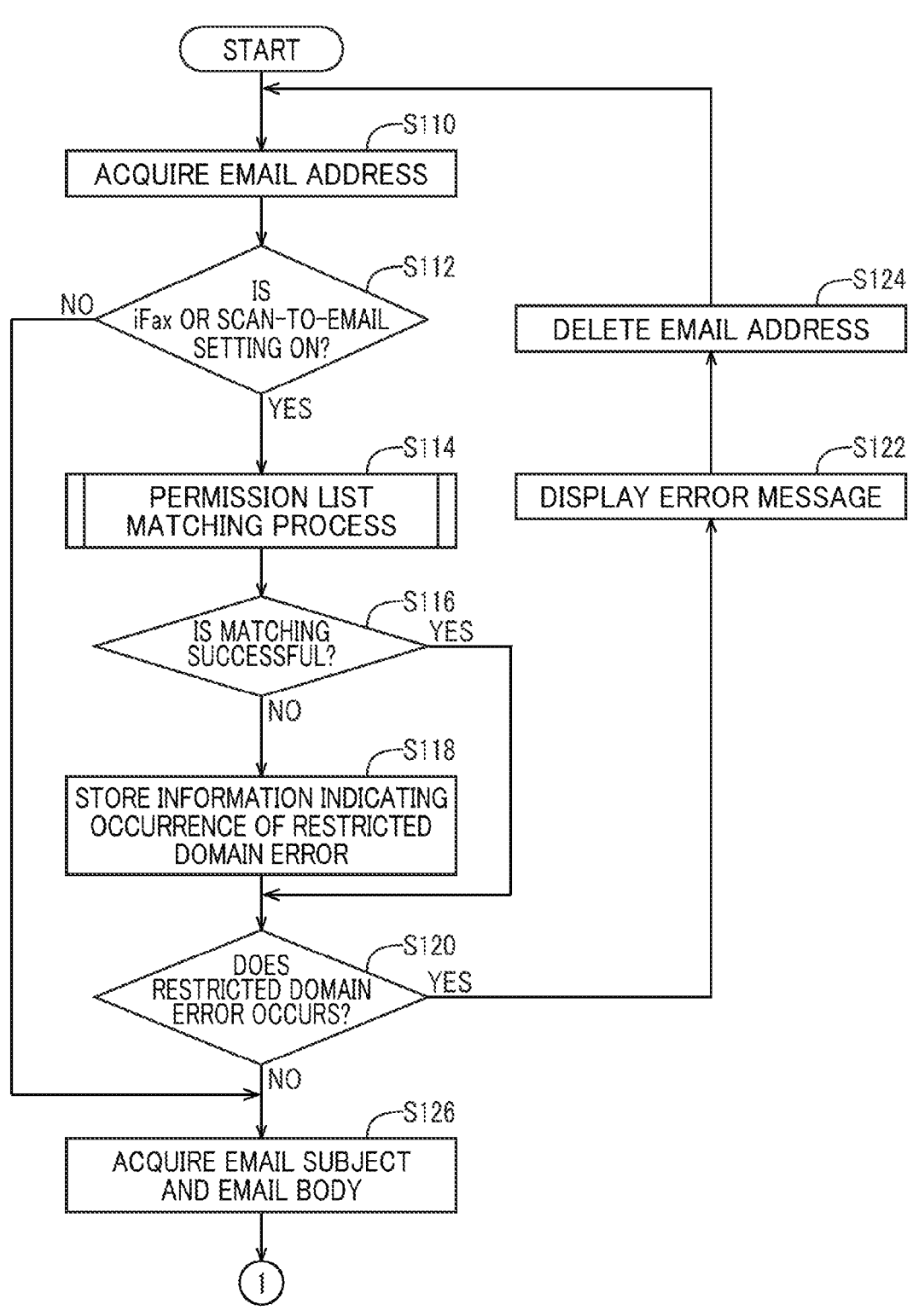
FIGS. 6-12 are flowcharts illustrating processes according to the control program.

In S110 of FIG. 6, the control program 34 first acquires the email address set in the input screen. The email address acquired in S110 will be called the "acquired address." In S112 the control program 34 references the permission list 90 stored in the data storage area 36 (see FIG. 4) to determine whether the iFax setting is ON. More generally, in S112 the control program 34 determines whether the user's selected job type is on (selected one of the iFax setting and the scan-to-email setting corresponding to the job type is on). When the iFax setting is ON (S112: YES), i.e., when the transmission of scan data is restricted in the iFax process, in S114 the control program 34 performs a permission list matching process.

Figure 8:
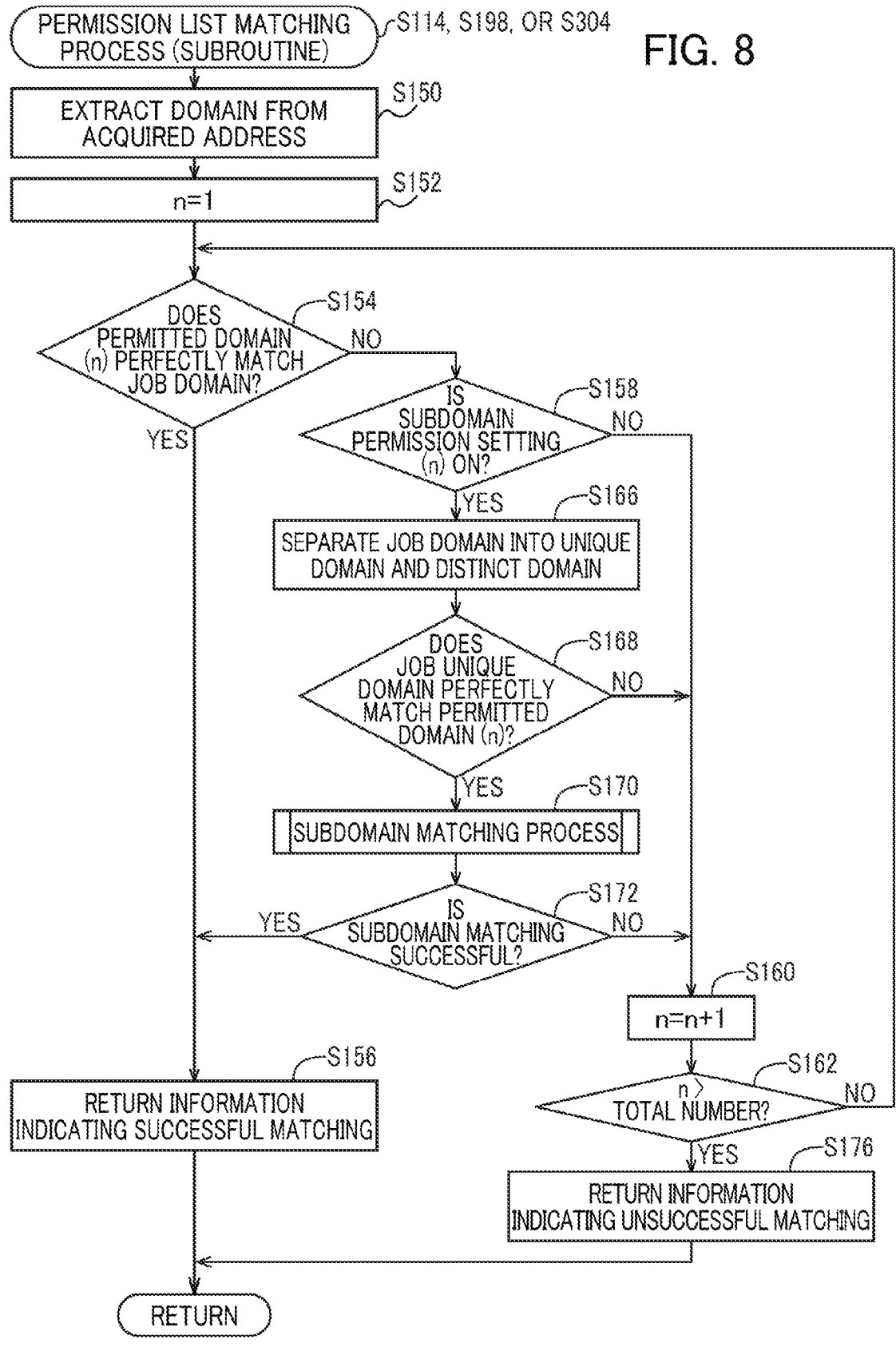

FIG. 8 shows steps in the permission list matching process. In S150 of FIG. 8, the control program 34 extracts the domain from the acquired address (hereinafter referred to as the "job domain"). The job domain is an example of an acquired domain. In S152 the control program 34 initializes a variable n to 1. In S154 the control program 34 determines whether the permitted domain (n) in the permission list 90 matches the job domain perfectly (exactly). That is, since n=1 in this case, the control program 34 determines whether permission domain (1) in the permission list 90, i.e., the domain "brother.co.jp", matches the job domain perfectly. When the job domain is "brother.co.jp" at this time, the control program 34 determines that the domains match perfectly (S154: YES) and in S156 returns information indicating that matching has been successful. The job domain is an example of an acquired domain.

However, when the job domain is the subdomain "ab.brother.co.jp" of the domain "brother.co.jp", then the permitted domain (1) does not perfectly match the job domain (S154: NO). Accordingly, in S158 the control program 34 determines whether the subdomain permission setting (1) is ON. Since the subdomain permission setting (1) is OFF in the example of FIG. 4 (S158: NO), in S160 the control program 34 increments the variable n by 1. Consequently, matching is not successful when the job domain is the subdomain "ab.brother.co.jp" of the domain "brother-.co.jp".

In S162 the control program 34 determines whether the variable n is greater than the total number of permitted domains in the permission list 90. Since three permitted domains have been set in the example of FIG. 4, the total number of permitted domains in the permission list 90 is 3. Further, since the variable n incremented by 1 in S160 is now set to 2, the variable n is not greater than the total number of permitted domains (S162: NO). Therefore, the control program 34 returns to S154 described above.

In S154 the control program 34 determines whether the permitted domain (2) in the permission list 90 matches the job domain perfectly. Since the permitted domain (2) in the example of FIG. 4 is "brothergroup.net", the control program 34 determines whether "brothergroup.net" matches the job domain perfectly. When the job domain is also "broth-ergroup.net", the control program 34 determines that the permitted domain perfectly matches the job domain (S154: YES) and in S156 returns information indicating that matching has been successful.

On the other hand, when the job domain is the subdomain "dp.brothergroup.net" of the domain "brothergroup.net", for example, the control program 34 determines in S154 that the permitted domain (2) does not match the job domain perfectly (S154: NO). Here, a subdomain indicates a subordinate domain of a main domain that will be referred to as "a unique domain". The subdomain name is a name of the subdomain including the main domain name added with a label that will be referred to as "a distinct domain" or "a subdomain label". In S158 the control program 34 determines whether the subdomain permission setting (2) is ON. Because the subdomain permission setting (2) is ON in the example of FIG. 4 (S158: YES), in S166 the control program 34 separates the job domain into its unique domain and distinct domain. Hence, the job domain "dp.brothergroup.net" is separated into the unique domain "brothergroup.net" and the distinct domain "dp". The unique domain separated from the job domain will be called the "job unique domain" while the distinct domain separated from the job domain will be called the "job distinct domain". In S168 the control program 34 determines whether the job unique domain matches the permitted domain (2) perfectly. Here, the job unique domain is "brothergroup.net" and the permitted domain (2) is also "brothergroup.net". Accordingly, the control program 34 determines that the domains match perfectly (S168: YES).

In S170 the control program 34 performs a subdomain matching process. Note that a subdomain is set on the basis of a main domain (a unique domain) by adding an arbitrary string of characters before the main domain (i.e., the unique domain).

For example, when "brothergroup.net" is the unique domain, "ap.brothergroup.net" formed by adding the string "ap" in front of this unique domain becomes a subdomain of "brothergroup.net". The character string added in front of the unique domain (e.g., "ap") is the distinct domain or the subdomain label. In other words, a subdomain (subdomain name) is configured of a distinct domain (subdomain label) (e.g., "ap") and a unique domain (e.g., "brothergroup.net").

In the permission list 90 of FIG. 4, the subdomain permission setting for the permitted domain (1) ("brother.co.jp") is OFF, while the subdomain permission setting (2) and subdomain permission setting (3) for the corresponding permitted domain (2) ("brothergroup.net") and the permitted domain (3) ("brother.ne.jp") are ON. Thus, when using this permission list 90 in the process performed by the control program 34, the transmission of scan data to email addresses having a subdomain of "brother.co.jp" is restricted, and the transmission of scan data to email addresses having a subdomain of "brothergroup.net" or a subdomain of "brother.ne.jp" is not restricted. In other words, scan data may be transmitted to subdomains of "brothergroup.net" and "brother.ne.jp". The subdomains of "brothergroup.net" and "brother.ne.jp" are examples of a specific domain.

Figure 9:
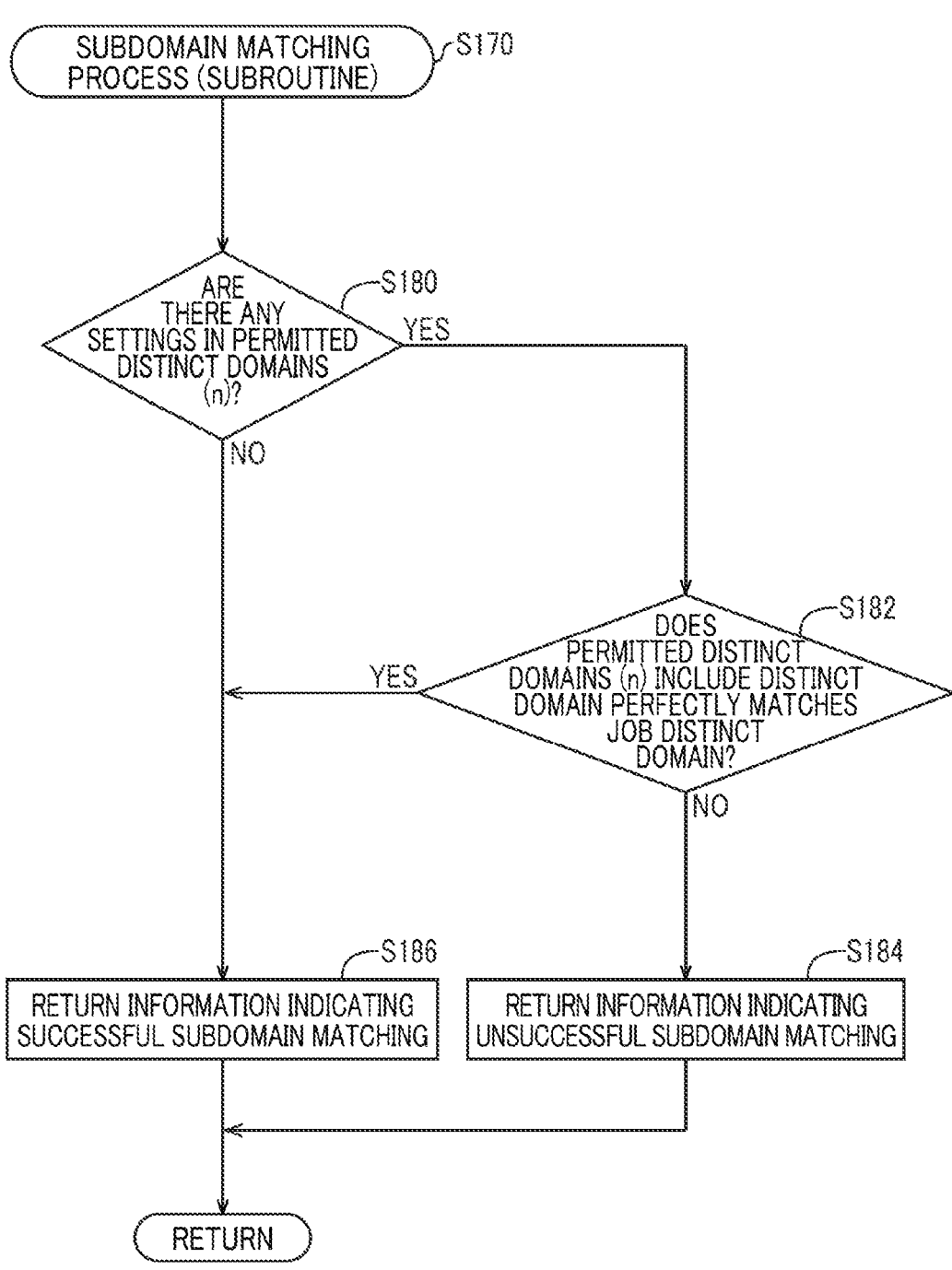

FIG. 9 shows steps in the subdomain matching process. In S180 at the beginning of the subdomain matching process, the control program 34 determines whether there are any settings (any subdomain label) for the permitted distinct domains (2). In the example of FIG. 3, the distinct domains "ap" and "dp" have been entered into the permitted distinct domain entry field 76b corresponding to the permitted domain "brothergroup.net". Accordingly, the transmission of scan data is permitted to email addresses having the subdomains "ap.brothergroup.net" and "dp.brothergroup- .net". The subdomains "ap.brothergroup.net" and "dp.brothergroup.net" are examples of a specific subdomain. Since "ap" and "dp" have been set in the permitted distinct domains (2), as shown in FIG. 4, the control program 34 determines that settings have been made for the permitted distinct domains (2) (S180: YES). Thus, in S182 the control program 34 determines whether the permitted distinct domains (2) include a distinct domain that perfectly matches the job distinct domain. Since "ap" and "dp" have been set in the permitted distinct domains (2) in this case and the job distinct domain is "dp", the control program 34 determines that a distinct domain in the permitted distinct domains (2) perfectly matches the job distinct domain (S182: YES), and in S186 returns information indicating that the subdomain matching has been successful. That is, matching is successful for the subdomain "dp.brothergroup.net" of the domain "brothergroup.net" that includes "dp". Since "ap" has also been set in the permitted distinct domains (2), matching would also be successful for the subdomain "ap.brothergroup.net" of the domain "brothergroup.net" that contains "ap".

However, when the job distinct domain is something other than "ap" and "dp", the control program 34 determines that nothing in the permitted distinct domains (2) matches the job distinct domain perfectly (S182: NO), and in S184 returns information indicating that the subdomain matching failed or unsuccessful. In other words, matching is successful only for the subdomains "dp.brothergroup.net" and "ap.brothergroup.net" and fails for all other subdomains. The control program 34 ends the subdomain matching process after completing step S184 or S186.

After completing the subdomain matching process of S170, in S172 of FIG. 8 the control program 34 determines whether the subdomain matching has been successful. When matching has been successful (S172: YES), in S156 the control program 34 returns information indicating that matching has been successful. However, when the subdomain matching failed (S172: NO), in S160 the control program 34 increments the variable n by 1. In this case, variable n is now set to 3. Therefore, since variable n is still not greater than the total number of permitted domains in the permission list 90 (3;S162: NO), the control program 34 returns to S154 described above.

In S154 the control program 34 determines whether the permitted domain (3) in the permission list 90 matches the job domain perfectly. Since the permitted domain (3) is "brother.ne.jp", when the job domain is also "brother.ne.jp", the control program 34 determines that the domains match perfectly (S154: YES) and in S156 the control program 34 returns information indicating that matching has been successful.

However, when the job domain is the subdomain "kp.brother.ne.jp" of the domain "brother.ne.jp", for example, the control program 34 determines that the permitted domain (3) does not match the job domain perfectly (S154: NO). Since the subdomain permission setting (3) is set to ON in the example of FIG. 4, in S168 the control program 34 determines whether the job unique domain matches the permitted domain (3) perfectly. Since the job unique domain is "brother.ne.jp" and the permitted domain (3) is also "brother.ne.jp", the control program 34 determines that the domains match perfectly (S168: YES). Therefore, in S170 the control program 34 performs the subdomain matching process.

In S180 of the subdomain matching process shown in FIG. 9, the control program 34 determines whether there are any settings (any subdomain label) has been made for the permitted distinct domains (3). In the example of FIG. 3, no distinct domain was inputted into the permitted distinct domain entry field 76c associated with the permitted domain "brother.ne.jp". Accordingly, the control program 34 determines in S180 that no setting has been made for the permitted distinct domains (3) (S180: NO). Note that when a distinct domain has not been entered into a permitted distinct domain entry field 76, all subdomains of the permitted domain corresponding to this permitted distinct domain entry field are permitted without restriction. In other words, the transmission of scan data is permitted to email addresses for all subdomains of the permitted domain "brother.ne.jp". Therefore, when the control program 34 determines in S180 that no setting has been made in the permitted distinct domains (3) (S180: NO), in S186 the control program 34 returns information indicating that the subdomain matching is successful. In other words, any subdomain of "brother.ne.jp" is determined to be a successful matching subdomain, even when the subdomain has the distinct domain "ap", "dp", or the like, as well as the distinct domain "kp".

After completing the subdomain matching process of S170, in S172 the control program 34 determines whether the subdomain matching has been successful. When matching has been successful (S172: YES), in S156 the control program 34 returns information indicating that matching has been successful. However, when the subdomain matching failed (S172: NO), in S160 the control program 34 increments the variable n by 1. In this example, variable n is now 4. Since variable n (=4) is now greater than the total number of permitted domains in the permission list 90 (=3) (S162: YES), in S176 the control program 34 returns information indicating that matching failed. Subsequently, the permission list matching process ends.

After completing the permission list matching process of S114, in S116 of FIG. 6 the control program 34 determines whether matching has been successful, on the basis of the information returned from the process of S114, that is, the information returned from S156 or S176 (FIG. 8). When matching failed (S116: NO), in S118 the control program 34 stores information in memory indicating that a restricted domain error has occurred, and subsequently advances to S120. The process of storing error information in memory to indicate an error may also be referred to as "generating an error." On the other hand, when matching has been successful (S116: YES), the control program 34 skips the process of S118, i.e., the control program 34 advances directly to S120 without generating information indicating that a restricted domain error has occurred. In S120 the control program 34 determines whether a restricted domain error has occurred on the basis of presence or absence of the error information stored in the memory 14. When a restricted domain error has occurred (S120: YES), in S122 the control program 34 displays an error message on the display 16. Subsequently, in S124 the control program 34 then deletes the email address set in the input screen. That is, the control program 34 deletes the setting for the email address to which scan data was scheduled to be transmitted in the iFax process. Subsequently, the control program 34 returns to S110.

However, when a restricted domain error has not occurred (S120: NO), in S126 the control program 34 acquires the email subject and email body (see FIG. 4) from the data storage area 36. Next, in S128 of FIG. 7 the control program 34 performs a scanning process and in S130 acquires the scan data generated in the scanning process. In S132 the control program 34 creates data for email transmission having the user's selected job type. In this case, because the user's selected job type is "iFax" in this example, in S132 the control program creates data for email transmission having the job type "iFax". This email transmission data includes information on the job type indicating "iFax", the acquired address, the email subject, the email body, and the scan data. After creating the email transmission data, in S134 the control program 34 performs an email transmission process.

Figure 10:
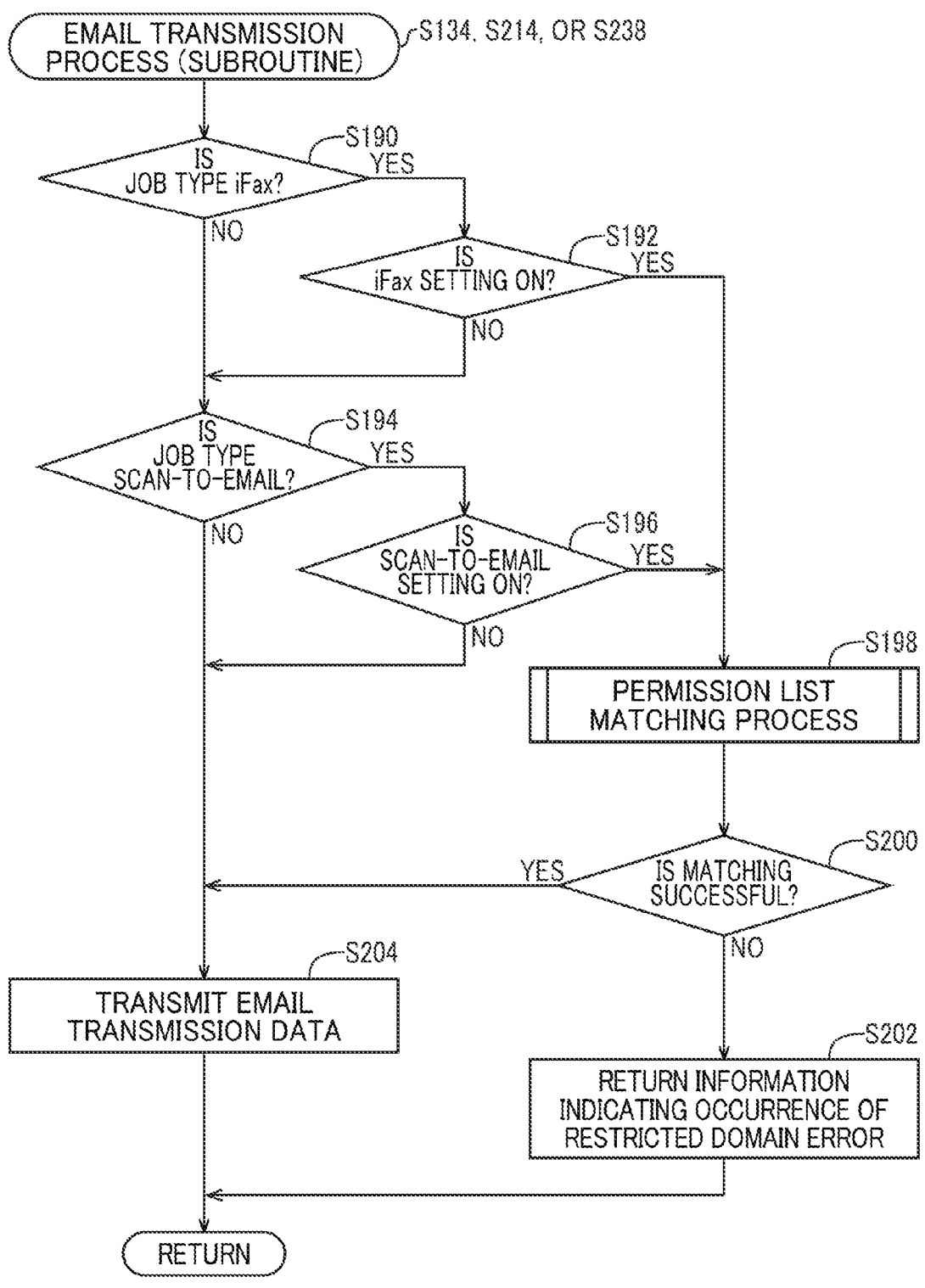

FIG. 10 shows steps in the email transmission process. In S190 of FIG. 10, the control program 34 determines whether the job type included in the email transmission data is "iFax". The target selection area 78 in FIG. 3 is used to select the process by which scan data is to be sent to domains registered in the permission list 90. In other words, the target selection area 78 serves to select the process to transmit scan data so that the transmission of scan data to domains not registered in the permission list 90 can be restricted in the selected process. Therefore, by inserting a checkmark in the checkbox 78a for selecting the iFax process, the transmission of scan data to email addresses having domains not registered in the permission list 90 will be restricted during the iFax process. Similarly, by inserting a checkmark in the checkbox 78b for selecting the scan-to-email process, the transmission of scan data to email addresses having domains not registered in the permission list 90 will be restricted during the scan-to-email process.

Since the job type included in the email transmission data created in the example described above is "iFax", the control program 34 determines in S190 that the job type is "iFax" (S190: YES) in this case. Therefore, in S192 the control program 34 determines whether the iFax setting in the data storage area 36 (FIG. 4) is ON. Since the iFax setting is ON in the example of FIG. 4, the control program 34 determines that the iFax setting is ON (S192: YES) and in S198 performs the permission list matching process. Since the permission list matching process has already been described, a description of the process will not be repeated here. After completing the permission list matching process, in S200 the control program 34 determines whether matching has been successful, on the basis of the information returned from the process of S114, that is, the information returned from S156 or S176 (FIG. 8). When matching failed (S200: NO), in S202 the control program 34 returns error information indicating that a restricted domain error has occurred and subsequently ends the email transmission process without transmitting the scan data. However, when matching was successful (S200: YES), in S204 the control program 34 transmits the email transmission data to the acquired address and subsequently ends the email transmission process.

Figure 7:
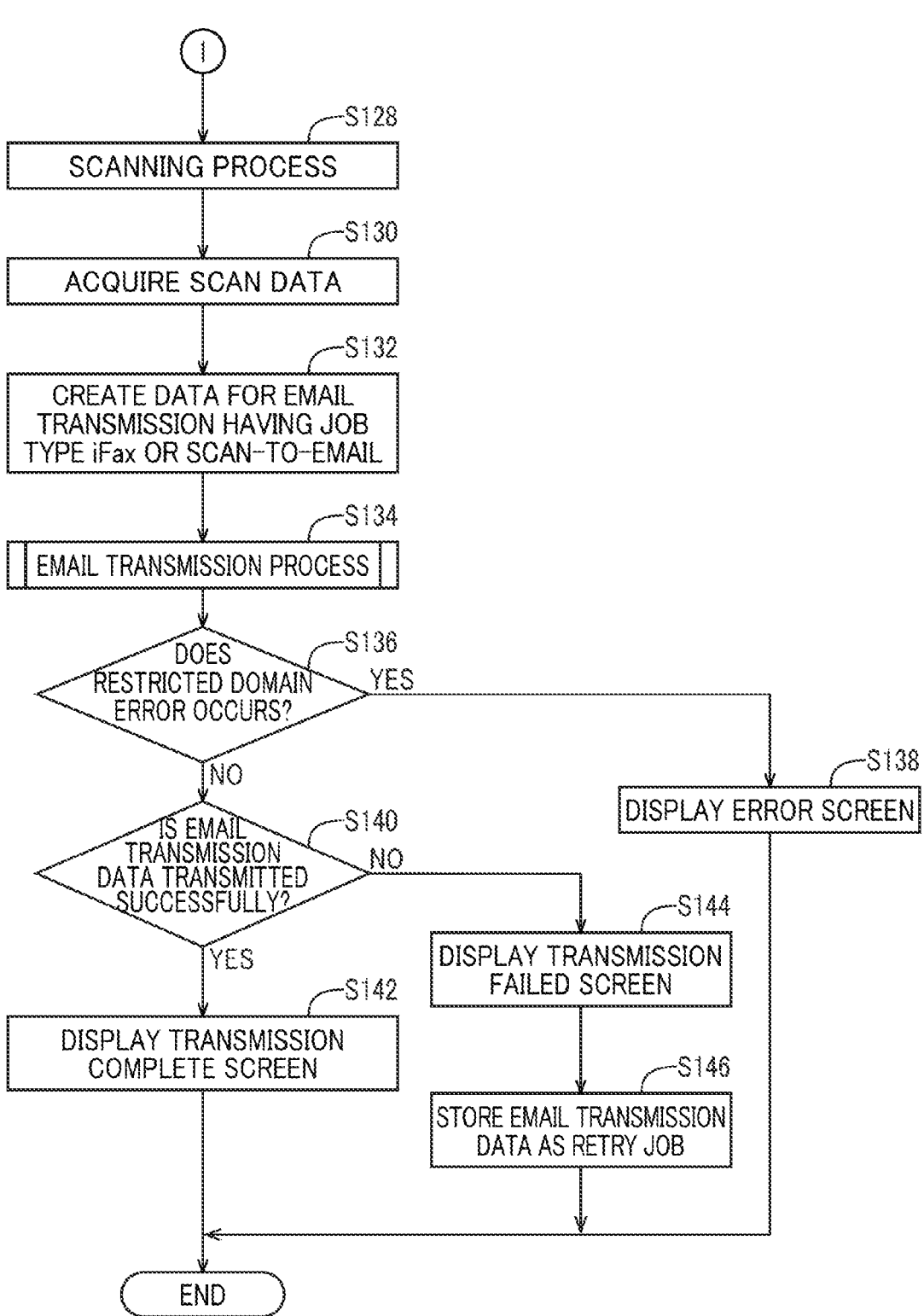

After completing the email transmission process of S134, in S136 of FIG. 7 the control program 34 determines whether a restricted domain error has occurred by determining whether the error information is returned from the mail transmission process. When a restricted domain error has occurred (S136: YES), in S138 the control program 34 displays an error screen on the display 16, and subsequently ends the process in FIG. 7. However, when a restricted domain error has not occurred (S136: NO), in S140 the control program 34 determines whether transmission of the email transmission data in S204 has been completed successfully. When transmission of the email transmission data has been completed successfully (S140: YES), in S142 the control program 34 displays a transmission complete screen on the display 16, and subsequently ends the process in FIG. 7. However, when the email transmission data has not been transmitted successfully (S140: NO), in S144 the control program 34 displays a transmission failed screen on the display 16. In S146 the control program 34 then stores the email transmission data in the data storage area 36 as a retry job (described later), and subsequently ends the process in FIG. 7.

Note that when the control program 34 determines in S112 of FIG. 6 that the iFax setting is OFF (S112: NO), the control program 34 skips the permission list matching process of S114 and advances directly to S126. Further, when the control program 34 determines in S192 of FIG. 10 that the iFax setting is OFF (S192: NO), in S194 the control program 34 determines whether the job type included in the email transmission data is "scan-to-email". Since the job type in this case is "iFax", the control program 34 determines that the job type is not "scan-to-email" (S194: NO) and advances to S204 described above. In other words, the control program 34 skips the permission list matching process of S198 when determining in S192 that the iFax setting is OFF (S192: NO). Therefore, when the iFax setting is OFF, the control program 34 performs the iFax process without verifying whether the acquired address is in the permission list 90. In other words, scan data is transmitted without restriction in the iFax process no matter what email address is set.

The scan-to-email process will be described next. To perform the scan-to-email process, the user operates the Scan icon 102c in the home screen 100 shown in FIG. 5. This operation displays an input screen on the display 16 for inputting a destination email address for the scan-to-email process. As in the iFax process, the user sets an email address in the input screen either manually or through a telephone directory. The input screen also includes a Start button. The control program 34 is started up when this Start button is operated. That is, the user select the job type "scan-to-email" to send scan data through the home screen 100 and the input screen. In other words, when the user selects the Scan icon 102c, sets the destination email address, and operates the Start button, the control program 34 receives a transmission instruction to transmit scan data to the destination email address via the scan-to-email process. Here, a non-administrator user as well as the administrator of the MFP 10 can issue the transmission instruction and thus is permitted to set the email address for the transmission instruction. The scan-to-email process performed by the control program 34 will be described here with reference to the flowcharts in FIGS. 6 through 10. However, because the scan-to-email process by the control program 34 is nearly identical to the iFax process by the control program 34 described above, only differing parts will be described.

In the scan-to-email process, in S112 of FIG. 6 the control program 34 determines whether the scan-to-email setting corresponding to the user's selected job type is ON. Further, in S132 (FIG. 7) the control program 34 creates email transmission data having the job type "scan-to-email" that is the user's selected job type. Further, in S190 (FIG. 10) the control program 34 determines that the job type is not "iFax" (S190: NO) and determines in S194 that the job type is "scan-to-email" (S194: YES). Thus, in S196 the control program 34 determines that the scan-to-email setting in the data storage area 36 (FIG. 4) is ON (S196: YES) and advances to S198. The remaining steps in this process are the same as in the iFax process by the control program 34 described above. Thus, just as in the iFax process, the transmission of scan data can be restricted in the scan-to-email process in accordance with the permission list 90.

Note that when the control program 34 determines in S196 that the scan-to-email setting is OFF (S196: NO), the control program 34 advances to S204 described above. In other words, the control program 34 skips the permission list matching process of S198 when determining in S196 that the scan-to-email setting is OFF (S196: NO) and performs the scan-to-email process without verifying whether the acquired address is in the permission list 90.

Figure 11:
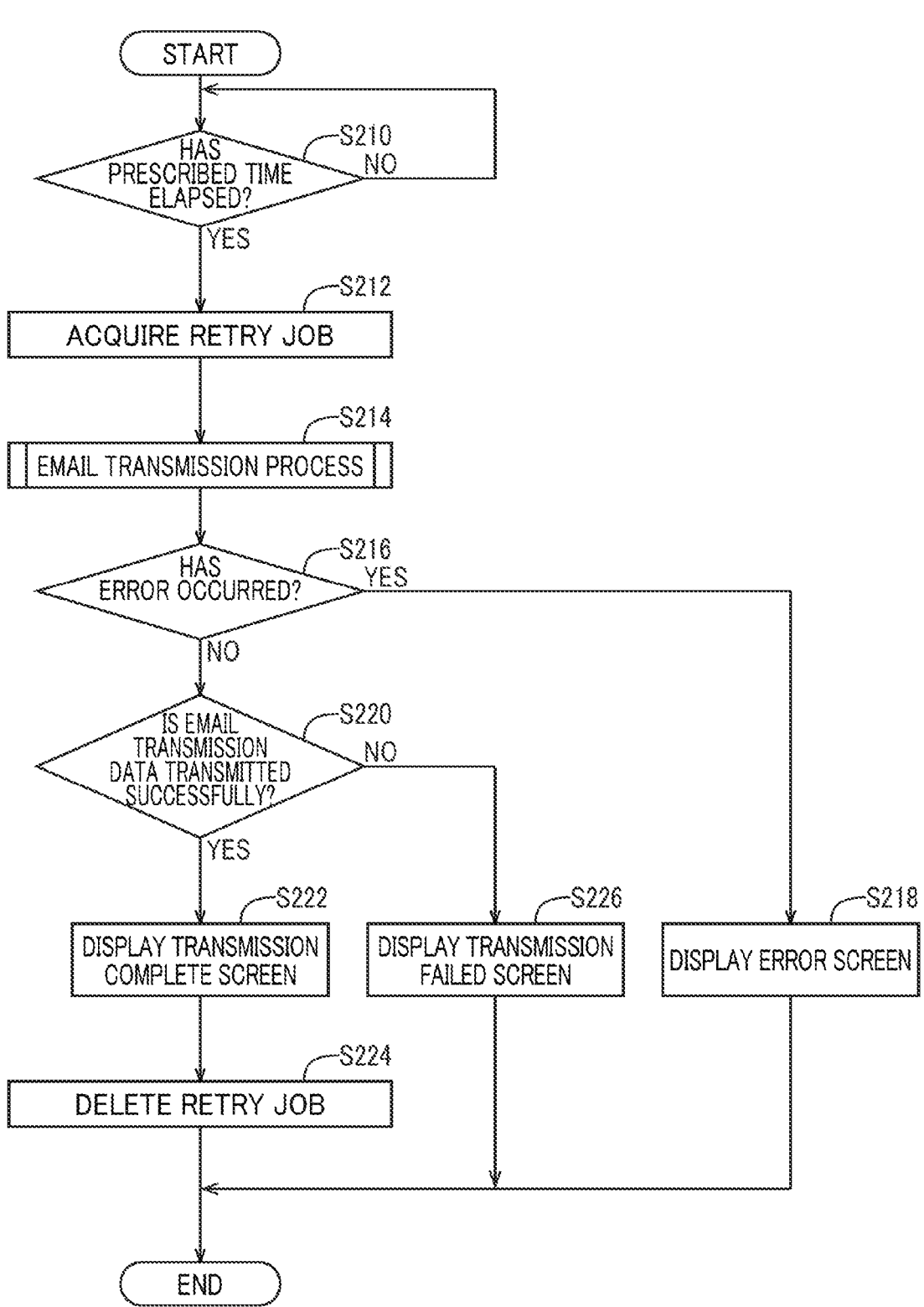

A retry job stored in the data storage area 36 in S146 (FIG. 7), i.e., email transmission data that was stored in the data storage area 36 after a failed email transmission, is retransmitted through a process of the control program 34. FIG. 11 shows steps in this process. In S210 of FIG. 11, the control program 34 determines whether a prescribed time has elapsed since the retry job was stored in the data storage area 36. The control program 34 continues repeating the determination while the prescribed time has not elapsed (S210: NO). Once the prescribed time has elapsed (S210: YES), in S212 the control program 34 acquires the email transmission data stored in the data storage area 36 as the retry job. In S214 the control program 34 performs the email transmission process. Since this process is identical to the email transmission process described above, a description of the process will not be repeated here.

In S216 the control program 34 determines whether a restricted domain error has occurred during the email transmission process by determining whether the error information is returned from the mail transmission process. When the restricted domain error has occurred (S216: YES), in S218 the control program 34 displays an error screen on the display 16, and subsequently ends the process in FIG. 11. However, when a restricted domain error has not occurred (S216: NO), in S220 the control program 34 determines whether the email transmission data has been transmitted successfully in the email transmission process. When transmission has been completed successfully (S220: YES), in S222 the control program 34 displays a transmission complete screen on the display 16 and in S224 deletes the retry job from the data storage area 36. This completes the process of FIG. 11. However, when transmission has not been completed successfully (S220: NO), in S226 the control program 34 displays a transmission failed screen on the display 16 and subsequently ends the process of FIG. 11. In this way, when a retry job is resent in an iFax process or scan-to-email process, the transmission of scan data is restricted according to the permission list 90.

Figure 12:
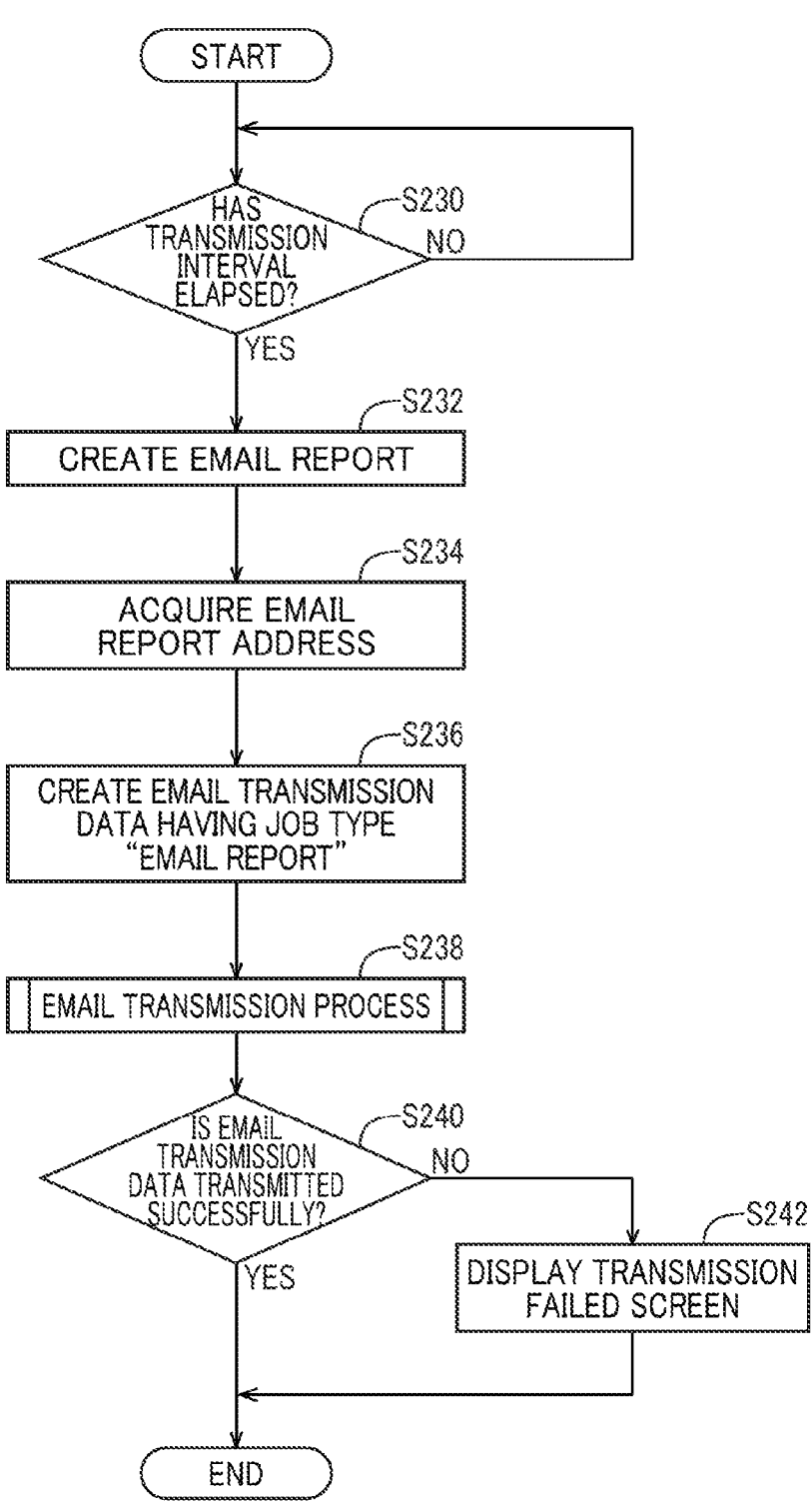

An email report issuing process is also performed according to the control program 34. FIG. 12 illustrates steps in the email report issuing process. In S230 of FIG. 12, the control program 34 determines whether the transmission interval for transmitting an email report has elapsed and repeats this determination while the transmission interval has not elapsed (S230: NO). As described above, the data storage area 36 stores the email report transmission interval (see FIG. 4), which the control program 34 uses to determine whether the transmission interval has elapsed. That is, the control program 34 periodically transmits an email report at the email report transmission interval. When the email report transmission interval has elapsed (S230: YES), in S232 the control program 34 creates an email report. That is, the control program 34 acquires the network information, operation history information, counter information, consumables information, and the like and creates an email report containing this information. In S234 the control program 34 acquires an email report address stored in the email report address 80t of the data storage area 36 (see FIG. 4). In S236 the control program 34 creates email transmission data having the job type "email report". This email transmission data includes the job type (email report), the email report address, and the email report itself. The email transmission data may include an instruction to transmit the email to the email address. The email report address 80*t* (FIG. 4) is set only by the administrator of the MFP 10, and thus only the administrator is permitted to set the email address report address for this instruction. After creating email transmission data for transmitting the email report, in S238 the control program 34 performs the email transmission process.

As shown in FIG. 10, in S190 of the email transmission process, the control program 34 determines whether the job type is "iFax". Since the job type for this email transmission data is "email report", the control program 34 determines that the job type is not "iFax" (S190: NO). In S194 the control program 34 determines whether the job type is "scan-to-email". Since the job type is "email report", the control program 34 determines that the job type is not "scan-to-email" (S194: NO). In S204 the control program 34 transmits the email transmission data created in S236 to the email report address and subsequently ends the email transmission process. After completing the email transmission process of S238, in S240 of FIG. 12 the control program 34 determines whether transmission has been completed successfully. When the email has been transmitted successfully (S240: YES), the control program 34 ends the process of FIG. 12. However, when the transmission has not been completed successfully (S240: NO), in S242 the control program 34 displays a transmission failed screen on the display 16 and subsequently ends the process of FIG. 12.

Because the job type is "email report" in the email report issuing process described above, the control program 34 reaches NO determinations in S190 and S194 of the email transmission process shown in FIG. 10. Consequently, the control program 34 does not perform the permission list matching process of S198 and transmits the email report without using the permission list 90 to verify the email report address. In other words, email reports can be sent without any restrictions in an email report issuing process, even when the email address set by the administrator is not included in the permission list 90.

The MFP 10 perform a shortcut function. In the short cut function, an icon is associated with a user's desired process and settings, and the associated process is performed with the associated settings when the icon is operated. The permission list 90 is used to restrict the transmission of scan data when an iFax process or scan-to-email process is performed on the MFP 10 using the shortcut function. That is, in a case that the shortcut information for executing for executing the iFax process or scan-to-email process is registered and the shortcut icon is operated, the CPU 12 receives a transmission instruction to transmit the scan data according to the corresponding one of the iFax process and the scan-to-email process to the email address included in the shortcut information and the process shown 6-11.

When registering shortcut information for executing the iFax process or scan-to-email process using a shortcut function, the permission list 90 is also used to restrict the registration of this shortcut function. This process will be described in greater detail with reference to FIGS. 13 and 14.

Figure 13:
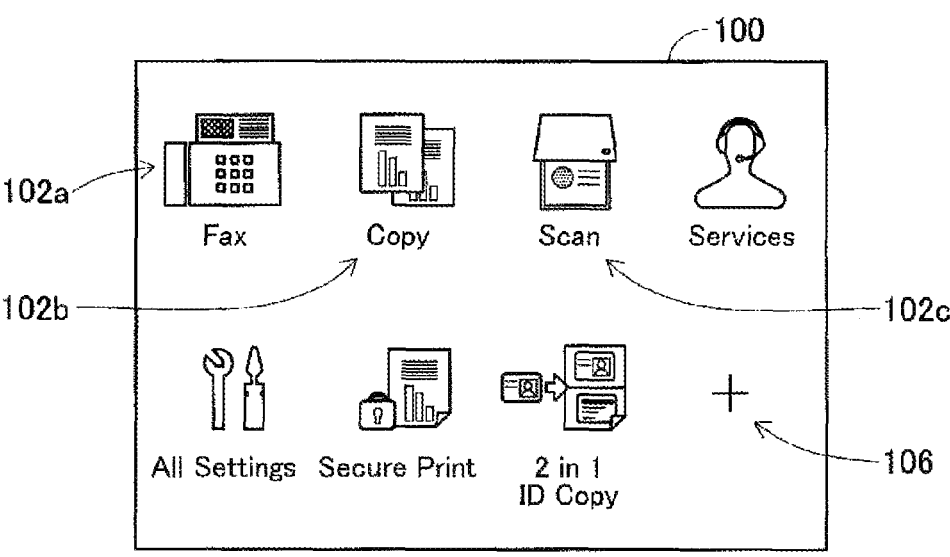
FIG. 13 an explanatory diagram illustrating a home screen.

As shown in FIG. 13, a blank space 106 is indicated in the home screen 100 with the "+" symbol. When the blank space 106 is operated, the control program 34 displays a selection screen for selecting a process to be performed using a shortcut function. The user can select any process displayed in this selection screen, such as a print process, scan process, iFax process, or scan-to-email process. For example, when the iFax process or scan-to-email process is selected at this time, the control program 34 displays an input screen for entering an email address. The user sets an email address in this input screen either manually or using a telephone directory, as in the input screen described above. The control program 34 also displays a settings screen for settings used when executing the iFax process or scan-to-email process, and the user enters various parameters such as resolution.

After completing a series of processes that include setting the email address and inputting these various parameters, the control program 34 displays a registration screen containing a Register button. When the user operates the Register button in this screen, shortcut information is registered for the process configured in the selection screen, the input screen, the settings screen, and the like. When registering shortcut information, the registration of this information is restricted in accordance with the permission list 90.

Figure 14:
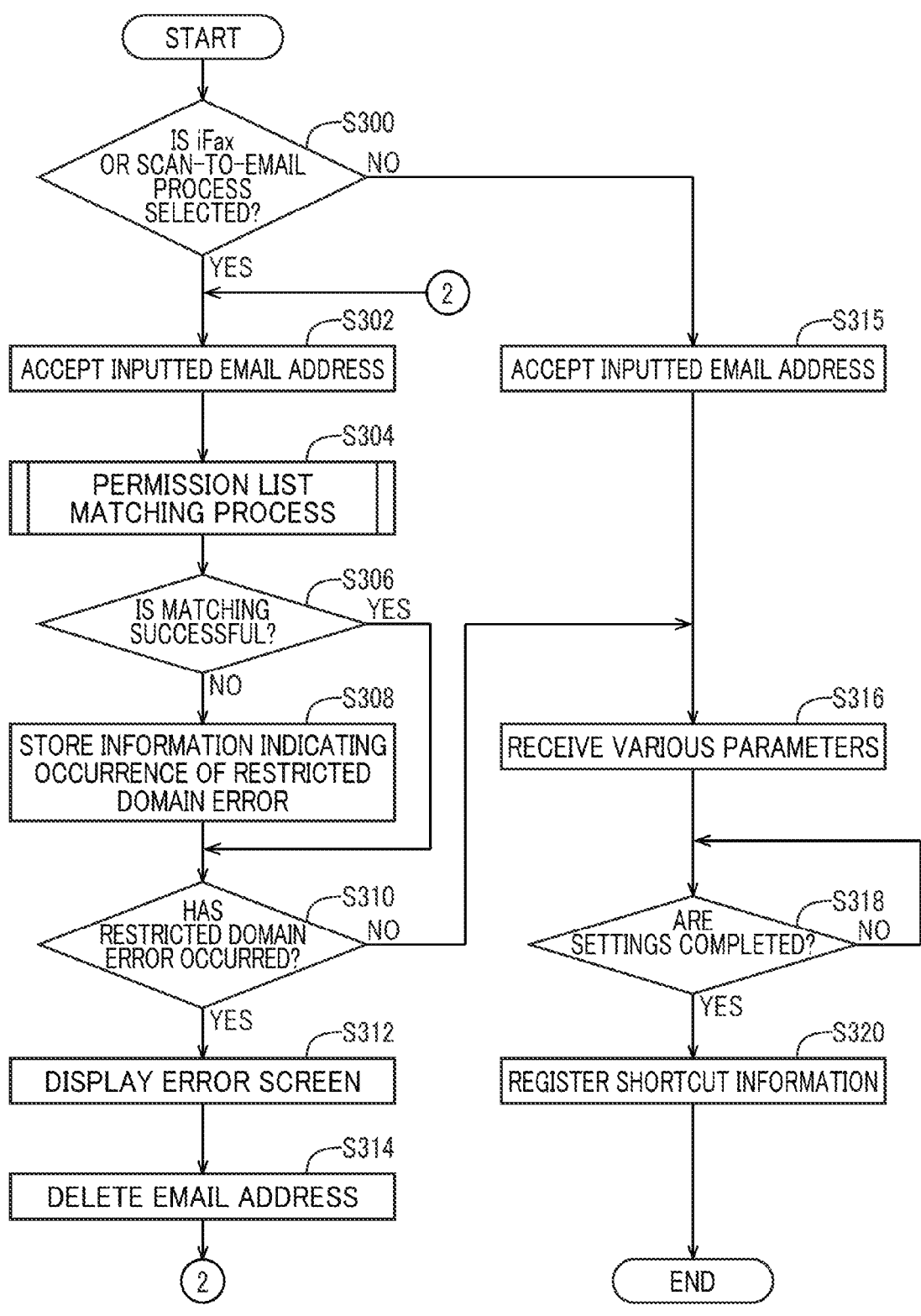
FIG. 14 is a flowchart illustrating a process performed according to the control program.

The detailed process to register shortcut information will be described while referring to FIG. 14. When a process to be performed using a shortcut function is selected in the selection screen, in S300 of FIG. 14 the control program 34 determines whether the selected process is the iFax process or the scan-to-email process. When the selected process is one of the iFax process or scan-to-email process (S300: YES), in S302 the control program 34 displays an input screen and accepts an email address inputted into the input screen. Thereafter, in S304 the control program 34 performs the permission list matching process. Since this process has been described above, a description will not be repeated here. However, the email address entered into the input screen in S302 is used as the acquired address in this permission list matching process of S304. The job domain acquired in the process of S150 (FIG. 8) of the permission matching process S304 from the email address set in S302, is an example of a domain of an email address to be registered in shortcut information. After completing the permission list matching process, in S306 the control program 34 determines whether matching has been successful, on the basis of the information returned from the process of S114, that is, the information returned from S156 or S176 (FIG. 8). When matching failed (S306: NO), in S308 the control program 34 generates and stores in the memory 14 error information indicating that a restricted domain error has occurred and advances to S310. On the other hand, when matching has been successful (S306: YES), the control program 34 skips the process in S308 and advances directly to S310 without generating information indicating that a restricted domain error has occurred.

In S310 the control program 34 determines whether a restricted domain error has occurred on the basis of existence or absence of the error information stored in the memory 14 in S310. When a restricted domain error has not occurred (S310: NO), in S316 the control program 34 displays a settings screen on the display 16 and receives various parameters entered into the settings screen. After parameters have been set, in S318 the control program 34 determines whether the Register button was operated after settings have been completed and repeats this determination while the Register button has not been operated (S318: NO). When the user operates the Register button after completing settings (S318: YES), in S320 the control program 34 registers shortcut information. In other words, shortcut information is registered in a case that the target of the shortcut function is either the iFax process or the scan-to-email process and the email address entered in the input screen is not restricted by the permission list 90.

On the other hand, when the control program 34 determines in S310 that a restricted domain error has occurred (S310: YES), in S312 the control program 34 displays an error screen on the display 16. In S314 the control program 34 deletes the email address entered in S302 and subsequently returns to S302 described above. In other words, shortcut information is not registered if the email address entered in the input screen is determined to be restricted by the permission list 90. That is, in a case that the target of the shortcut function is either the iFax process or the scan-to-email process and the email address entered into the input screen is restricted by the permission list 90, registration of shortcut information is restricted. In this case, the control program 34 returns to S302, allowing the user to enter a different email address.

When the process selected in S300 is neither the iFax process nor the scan-to-email process (S300: NO), in S315 the control program 34 displays an input screen and accepts an email address inputted into the input screen. Thereafter, in S316 the control program 34 performs the process from S316 described above, thereby registering shortcut information in S320.

After shortcut information has been registered, a new Shortcut icon 102*d* for executing this shortcut function is displayed in the home screen 100, as shown in FIG. 5, at the position of the blank space 106 (see FIG. 13). Further, when shortcut information is registered, shortcut information such as that shown in FIG. 15 is stored in the data storage area 36. This shortcut information includes information on the target process of the shortcut function and the destination email address and various parameters to be used in this process.

Further, when executing an iFax process or a scan-to-email process using a shortcut function registered according to the above method, the transmission of scan data is restricted using the permission list 90. More specifically, when the Shortcut icon 102*d* is operated in the home screen 100, the control program 34 specifies the target process of the shortcut function (corresponding to the shortcut function shown in FIG. 15) from shortcut information on the shortcut function associated with the operated Shortcut icon 102*d*. That is, the control program 34 determines the job type based on the target process. In other words, when the user selects the Shortcut icon 102*d* for executing the iFax process or the scan-to-email process, the control program 34 receives a transmission instruction to transmit scan data to the destination email address via the iFax process or the scan-to-email process on the basis of based the shortcut information. Next, the control program 34 determines whether the specified process is the iFax process or the scan-to-email process. When the specified process is either the iFax process or the scan-to-email process, the control program 34 acquires the email address (see FIG. 15) from the shortcut information and performs the process shown in FIGS. 6 through 10. The email address acquired from the shortcut information is treated as the acquired address when executing the process shown in FIGS. 6 through 10. In this way, the permission list 90 is used to restrict the transmission of scan data when executing an iFax process or scan-to-email process through a shortcut function. The domain of the email address acquired from the shortcut information is an example of a set domain and an example of a target domain.

Note that when the process specified from the shortcut information is a process other than the iFax process or scan-to-email process, i.e., when the process to be performed through an operation of the Shortcut icon 102*d* is a process other than the iFax process or scan-to-email process, the control program 34 performs the process of the shortcut function associated with the operated Shortcut icon 102*d* without implementing restrictions in accordance with the permission list 90.

The embodiment described above obtains the following effects.

As described above, "brother.co.jp", "brothergroup.net", and "brother.ne.jp" are permitted domains. Of these, "brothergroup.net" and "brother.ne.jp" are permitted domains as examples of specific domains. The control program 34 transmits scan data on a condition that the job domain is a subdomain of a specific domain, even when the job domain in the acquired address does not match any of the permitted domains. Thus, subdomains of any domain among the permitted domains can be set as target domains for transmitting scan data.

Further, when the user enters checkmarks in the subdomain permission checkboxes 74*b* and 74*c* (FIG. 3) associated respectively with "brothergroup.net" and "brother.ne.jp", the control program 34 stores these domains in the data storage area 36 as other examples of specific domains, i.e., domains whose subdomains are permitted for transmitting scan data. This allows the user to set specific domains as desired.

In the example of FIG. 3, the distinct domains (subdomain labels) "ap" and "dp" are entered in the permitted distinct domain entry field 76*b* corresponding to the domain "brothergroup.net", for which a checkmark was inputted into the corresponding subdomain permission checkbox 74*b*. Thus, even when the job domain does not match the permitted domain ("brothergroup.net"), the control program 34 transmits scan data on a condition that the job domain is a subdomain of "brothergroup.net" that contains the distinct domain "ap" or "dp". This enables the user to set desired subdomains of a specific domain as target domains for transmitting scan data.

In the example of FIG. 3, no distinct domains have been entered in the permitted distinct domain entry field 76*c* corresponding to "brother.ne.jp", which has a checkmark inputted in the corresponding subdomain permission checkbox 74*c*. When a distinct domain has not been entered into the permitted distinct domain entry field 76*c* despite a checkmark being entered into the corresponding subdomain permission checkbox 74*c,* as in this case, the control program 34 transmits scan data on a condition that the job domain is a subdomain of "brother.ne.jp", even when the job domain does not match the permitted domain ("brother.ne.jp"). Thus, the user can set all subdomains of a desired specific domain as target domains for transmitting scan data. The permitted distinct domains (3) 80*o* having no distinct domain when the subdomain permission setting (3) 80*j* is set to ON indicates that all the subdomains are permitted for transmitting scan data. This subdomain permission setting (3) 80*j* when no distinct domain is set is an example of permitting information.

As in the embodiment described above, the permission list settings screen 70 (FIG. 3) is displayed when identification information managed by the administrator of the MFP 10 is inputted into the MFP 10 as login information. Thus, only the administrator of the MFP 10 can enter checkmarks into the subdomain permission setting area 74 of the permission list settings screen 70. Accordingly, specific domains can only be set by the administrator.

As described above, the transmission of scan data may be restricted in iFax processes and scan-to-email processes but is not restricted in email report issuing processes. Accordingly, the email report issuing process, whose execution is restricted to administrators, can be performed irrespective of the permission list 90.

In the permission list settings screen 70 shown in FIG. 3, the target selection area 78 is displayed for selecting one or more of the iFax process and the scan-to-email process, but a selection field for selecting the email report issuing process is not included in the permission list settings screen 70. In other words, a permission list 90 can be set for at least one of the iFax process and scan-to-email process but not for the email report issuing process. In this way, the email report issuing process can be excluded from the processes subject to the permission list 90.

The permission list matching process is performed when an email address is acquired, as described in FIG. 6, and after email transmission data is created, as described in FIGS. 7 and 10. Accordingly, when the permission list 90 is modified between the time an email address is acquired and the time email transmission data is created, the control program 34 can still restrict the transmission of scan data on the basis of the modified permission list 90.

As shown in FIGS. 11 and 10, the permission list matching process is also performed when a retry job is retransmitted. Accordingly, even when the permission list 90 is modified during the period between a failed transmission of email transmission data and the retransmission of this email transmission data, the control program 34 can restrict the transmission of scan data on the basis of the modified permission list 90.

In the example described above, "ap" and "dp" are stored in the data storage area 36 as distinct domains of "brothergroup.net". Thus, the control program 34 transmits scan data on the condition that the job domain is a subdomain of "brothergroup.net" that contains the distinct domain "ap" or "dp", even when the job domain does not match the permitted domain ("brothergroup.net"). In this way, the user can set desired subdomains of a specific domain as target domains for transmitting scan data.

As described above, the permission list settings screen 70 (FIG. 3) is displayed when identification information managed by the administrator of the MFP 10 is inputted into the MFP 10 as login information. In other words, only the administrator of the MFP 10 can enter distinct domains in the permitted distinct domain entry area 76 of the permission list settings screen 70. Distinct domains entered in the permitted distinct domain entry area 76 are then stored in the data storage area 36. In this way, the administrator can set desired subdomains as target domains for transmitting scan data.

When setting the destination for scan data, i.e., an email address, as described above, the user can select an email address from either the telephone directory stored in the data storage area 36 or the telephone directory stored on the server 50. The control program 34 performs the permission list matching process on both email addresses selected from the telephone directory stored in the data storage area 36 and email addresses selected from the telephone directory stored on the server 50. Thus, the transmission of scan data is restricted when the job domain does not match any permitted domain. Accordingly, the control program 34 can use the permission list 90 to restrict the transmission of scan data not only to email addresses inputted manually by the user but also to email addresses stored on the MFP 10 or an external device.

As described above, whether the iFax process or the scan-to-email process is performed in response to an operation on the Shortcut icon 102d in the home screen 100 or in response to an operation on the Fax icon 102a or Scan icon 102c shown in FIG. 5, the control program 34 restricts the transmission of scan data when the job domain does not match any permitted domain. In other words, the transmission of scan data is restricted in the iFax process or the scan-to-email process when the job domain does not match any permitted domain, irrespective of whether the process is performed using a shortcut function or not. Accordingly, the control program 34 can restrict the transmission of scan data according to a permission list 90 in the iFax process or scan-to-email process performed using a shortcut function.

As described above, only the administrator of the MFP 10 can input checkmarks into the subdomain permission setting area 74 of the permission list settings screen 70. Thus, specific domains can only be set by the administrator. Further, the transmission of scan data may be restricted in the iFax process and the scan-to-email process but not in the email report issuing process. In this way, the email report issuing process, whose execution is limited to administrators, can be performed irrespective of the permission list 90.

Additionally, a destination email address may be preset in the shortcut information, and the transmission of scan data to this destination email address may be restricted when the domain of the address (=the job domain) does not match any permitted domains. Accordingly, the control program 34 can restrict the transmission of scan data according to the permission list 90, even during the iFax or scan-to-email process performed using a shortcut function.

When registering shortcut information in the embodiment described above, registration is restricted when the domain of the email address (=the job domain) to be registered does not match any permitted domains. This can prevent the registration of shortcut information having an email address to which the transmission of scan data is restricted by the permission list 90.

There may be a case that the non-administrator user or the administrator issues the transmission instruction to transmit scan data via the iFax process or the scan-to-email process to a destination email address having a domain the same as that of the email address stored in the email report address 80t set by the administrator. In such a case, the process shown in FIGS. 6-11 are performed, and thus the transmission of the scan data is restricted through determination steps S154-S176 of FIG. 8. That is, the CPU 12 performs restricting transmission of the scan data on the basis of determination steps S154-S176 of FIG. 8 even when the domain of the destination email address is the same as that stored in the email report address 80t.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Specifically, in the embodiment described above, the transmission of scan data is restricted when using the shortcut function to perform the iFax process or scan-toemail process. However, the transmission of scan data may also be restricted when using a shortcut function to perform processes other than the iFax process and scan-to-email process.

In the above embodiment, as shown in FIG. 3 the permitted domain entry area 72, subdomain permission setting area 74, and permitted distinct domain entry area 76 are displayed in the permission list settings screen 70, but the permission list settings screen 70 may be configured to include only the permitted domain entry area 72 and subdomain permission setting area 74 and not the permitted distinct domain entry area 76. In such a case, all subdomains of permitted domains having a checkmark in the corresponding subdomain permission setting area 74 are treated as subdomains to which scan data can be transmitted. Alternatively, the permission list settings screen 70 may be configured to include the permitted domain entry area 72 and permitted distinct domain entry area 76 and not the subdomain permission setting area 74. In such a case, the subdomains that include a distinct domain entered in the permitted distinct domain entry area 76 are treated as subdomains to which scan data can be transmitted.

In the above embodiment, the permitted distinct domains (n) having no distinct domain when the corresponding subdomain permission setting (n) is set to ON indicates that all the subdomains are permitted for transmitting scan data. However, the permitted distinct domains (n) having information on all the subdomains when the corresponding subdomain permission setting (n) is set to ON may indicate that all the subdomains are permitted for transmitting scan data.

In the above embodiment, the transmission of scan data can be restricted in the iFax process and the scan-to-email process but is not restricted in the email report issuing process. However, the transmission of scan data may also be restricted in the email report issuing process.

In the above embodiment, the permission list matching process is performed when an email address is acquired, and is performed again after email transmission data is created. However, the permission list matching process may be performed once, either when an email address is acquired or after email transmission data is created.

In the above embodiment, the CPU 12 performs the processes shown in FIGS. 2, 6-12, and 14. However, one or more other logic integrated circuits such as an application specific integrated circuit (ASIC) may perform these processes, or any combination of one or more CPUs and one or more logic integrated circuits including the ASIC may perform these processes in a cooperated manner.

What is claimed is:

1. An image forming device comprising:
a communication interface;
a memory;
a controller; and
a scanner,
wherein the controller is configured to perform:
a transmission process in response to determining that a first condition is met, the first condition including:
a requirement that a transmission instruction including an email address is received;; and a requirement that the memory stores a registered domain matching a target domain extracted from the email address, wherein the transmission instruction is an instruction to transmit scan data to be generated by the scanner to the email address, the transmission process being a process to transmit an email having the generated scan data to the email address;

restricting the transmission process enin response to determining that a second condition is met, the second condition including: a requirement that the transmission instruction is received; and a requirement that the memory stores no registered domain matching the target domain; and
the transmission process in response to determining that a third condition is met, the third condition including: a requirement that the transmission instruction is received; a requirement that the memory stores no registered domain matching the target domain;; and a requirement that the target domain is a subdomain of a specific domain, wherein the specific domain is a registered domain stored in the memory.

2. The image forming device according to claim 1, further comprising:
a user interface,
wherein the controller is configured to further perform:
storing each of one or more registered domains as the specific domain in the memory when an operation, which specifies the one or more registered domains, is received via the user interface,
wherein the third condition further includes a requirement that the target domain is the subdomain of the specific domain stored in the storing.

3. The image forming device according to claim 2, wherein the controller is configured to further perform:
storing information related to a designated subdomain in the memory when an operation designating the subdomain of the specific domain is received via the user interface,
wherein the third condition further includes a requirement that the target domain matches the designated subdomain specified on the basis of the information stored in the memory.

4. The image forming device according to claim 2, wherein the controller is configured to further perform:
storing, in the memory, permission information indicating any-subdomain permission when an operation, which sets the any-subdomain permission to transmit an email to any subdomain of the specific domain, is received via the user interface,
wherein the third condition further includes a requirement that the memory stores the permission information.

5. The image forming device according to claim 2, wherein when the operation, which specifies the one or more registered domains, is received from an administrator of the image forming device via the user interface, the controller performs the storing each of the one or more registered domains as the specific domain in the memory.

6. The image forming device according to claim 3, wherein when the operation designating the subdomain of the specific domain is received from an administrator of the image forming device via the user interface, the controller performs the storing the information related to the designated subdomain in the memory.

7. The image forming device according to claim 1, wherein the controller is configured to further perform:
an administrator-instructed transmission process, as a process to transmit an email other than the transmission process, only an administrator of the image forming device being permitted to set an administrator-set email address for the administrator-instructed transmission process,
wherein the administrator-instructed transmission process is to transmit an email to the administrator-set email address even when the memory stores no registered domain matching a domain extracted from the administrator-set email address, wherein the controller performs the administrator-instructed transmission process even when a domain extracted from the administrator-set email address matches no registered domain stored in the memory, wherein for the transmission instruction, a non-administrator user as well as the administrator is permitted to set the email address, wherein in response to determining that the second condition is met, the controller performs the restricting even when the target domain is the same as the domain of the administrator-set email address.

8. The image forming device according to claim 7, further comprising:

a user interface, wherein the controller is configured to further perform:

displaying a selection screen on the user interface, the selection screen including a plurality of options corresponding to respective ones of a plurality of manners so that one of the plurality of manners can be selected, each of the plurality of manners being a manner in which the transmission process is performed, wherein when one of the plurality of manners is selected through the selection screen, the transmission instruction is issued with a designation of the selected manner, wherein the first condition further includes a requirement that the transmission instruction is received with the designation of the selected manner through the selection screen, wherein in response to determining that the first condition is met, the controller performs the transmission process according to the selected manner, wherein the second condition further includes a requirement that the transmission instruction is received with the designation of the selected manner through the selection screen, wherein the user interface displays no option to select execution of the administrator- instructed transmission process.

9. The image forming device according to claim 1, wherein the controller is configured to further perform:

a first determination process after acquiring the email address from the transmission instruction, the first determination process being a process to determine whether the memory stores the registered domain matching the target domain; and a second determination process after acquiring the scan data generated by the scanner, the second determination process being a process to determine whether the memory stores the registered domain matching the target domain, wherein the second condition further includes a requirement that the first determination process or the second determination process determines that the memory stores no registered domain matching the target domain.

10. The image forming device according to claim 1, wherein the controller is configured to further perform:

a first determination process after acquiring the email address from the transmission instruction, the first determination process being a process to determine whether the memory stores the registered domain matching the target domain; and a second determination process after the transmission process ends unsuccessfully and before retransmitting the scan data starts, the second determination process being a process to determine whether the memory stores the registered domain matching the target domain, wherein the second condition further includes a requirement that the first determination process or the second determination process determines that the memory stores no registered domain matching the target domain.

11. An image forming device comprising:
a communication interface;
a memory;
a controller; and
a scanner, wherein the controller is configured to perform:

a transmission process in response to determining that a first condition is met, the first condition including: a requirement that a transmission instruction including an email address is received; and a requirement that the memory stores a registered domain matching a target domain extracted from the email address, wherein the transmission instruction is an instruction to transmit scan data to be generated by the scanner to the email address, the transmission process being a process to transmit an email having the generated scan data to the email address;

restricting the transmission process in response to determining that a second condition is met, the second condition including: a requirement that the transmission instruction is received; and a requirement that the memory stores no registered domain matching the target domain; and the transmission process in response to determining that a third condition is met, the third condition including: a requirement that the transmission instruction is received; and a requirement that the memory stores no registered domain matching the target domain, and the target domain is a specific subdomain of a registered domain stored in the memory, the specific subdomain being specified by information stored in the memory.

12. The image forming device according to claim 11, further comprising:

a user interface, wherein the controller is configured to further perform:

storing information related to the specific subdomain in the memory when an operation designating the specific subdomain of the registered domain is received via the user interface.

13. An image forming device comprising:
a communication interface;
a memory;
a controller; and
a scanner, wherein the controller is configured to perform:

acquiring an email address for transmitting scan data from the memory or an external device;

a transmission process in response to determining that a first condition is met, the first condition including: a requirement that the email address for transmitting the scan data to be generated by the scanner is acquired; and a requirement that the memory stores a registered domain matching a target domain extracted from the email address, the transmission process being a process to transmit an email having the scan data generated by the scanner to the email address; and restricting the transmission process in response to determining that a second condition is met, the second condition including: a requirement that the email address for transmitting the scan data to be generated by the scanner is acquired; and a requirement that the memory stores no registered domain matching the target domain, the restricting the transmission process being performed irrespective of whether the email address is acquired from the memory or the external device.

14. The image forming device according to claim 13, wherein in response to determining that the second condition is met, the controller performs the restricting irrespective of whether the email address is acquired through a shortcut method or a non-shortcut method, the shortcut method being to perform a predetermined process using a predetermined setting when a shortcut is operated.

15. The image forming device according to claim 13, further comprising:

a user interface, wherein the controller is configured to further perform:

storing each of one or more registered domains in the memory when an operation, which specifies the one or more registered domains, is received via the user interface; and an administrator-instructed transmission process, as a process to transmit an email other than the transmission process, wherein the administrator-instructed transmission process is to transmit an email to an administrator-set email address even when the memory stores no registered domain matching a domain extracted from the administrator-set email address, only an administrator of the image forming device being permitted to set the administrator-set email address for the administrator-instructed transmission process, wherein the controller performs the administrator-instructed transmission process even when a domain extracted from the administrator-set email address matches no registered domain stored in the memory, wherein for the transmission process, a non-administrator user as well as the administrator is permitted to set the email address, wherein in response to determining that the second condition is met, the controller performs the restricting even when the target domain is the same as the domain of the administrator-set email address.

16. An image forming device comprising:

a communication interface;

a memory;

a controller; and a scanner, wherein the memory stores shortcut information including: a setting value to be used to generate scan data; and an email address to which the scan data is to be transmitted via the communication interface, wherein the controller is configured to perform:

a transmission process in response to determining that a first condition is met, the first condition including: a requirement that a shortcut instruction including the email address in the shortcut information is received; and a requirement that the memory, stores a registered domain as information different from the shortcut information matching a target domain extracted from the email address in the shortcut information, wherein the shortcut instruction is to transmit the scan data to be generated by the scanner to the email address included in the shortcut information, the transmission process being a process to transmit the generated scan data to the email address included in the shortcut information with the setting value included in the shortcut information; and restricting the transmission process enin response to determining that a second condition is met, the second condition including: a requirement that the shortcut instruction is received; and a requirement that the memory stores no registered domain matching a target domain extracted from the email address in the shortcut information.

17. The image forming device according to claim 16, wherein the controller is configured to further perform:

storing, when an email address is received for the shortcut information and the memory stores a registered domain matching a domain extracted from the received email address, the shortcut information including the received email address to which the scan data to be transmitted via the communication interface; and restricting the storing the shortcut information when the email address is received for the shortcut information, and the memory stores no registered domain matching the target domain.

* * * * *